US011470517B2

(12) United States Patent
Saily et al.

(10) Patent No.: US 11,470,517 B2
(45) Date of Patent: Oct. 11, 2022

(54) TWO-STEP ADDITION OF A PRIMARY-SECONDARY CELL, PSCELL, IN A MULTI-CONNECTED HANDOVER

(71) Applicant: Nokia Technologies Oy, Espoo (FI)

(72) Inventors: Mikko Saily, Laukkoski (FI); Tommi Jokela, Espoo (FI); Ingo Viering, Munich (DE)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/734,956

(22) PCT Filed: Jun. 12, 2018

(86) PCT No.: PCT/US2018/037057
§ 371 (c)(1),
(2) Date: Dec. 3, 2020

(87) PCT Pub. No.: WO2019/240770
PCT Pub. Date: Dec. 19, 2019

(65) Prior Publication Data
US 2021/0235333 A1    Jul. 29, 2021

(51) Int. Cl.
*H04W 36/00*    (2009.01)
*H04W 36/30*    (2009.01)

(52) U.S. Cl.
CPC ... *H04W 36/0069* (2018.08); *H04W 36/0077* (2013.01); *H04W 36/305* (2018.08)

(58) Field of Classification Search
None
See application file for complete search history.

(56) References Cited

U.S. PATENT DOCUMENTS 10,601,535 B2 *   3/2020   Kim ................... H04W 76/27
11,096,016 B2 *   8/2021   Chen .................. H04L 5/0091
(Continued)

FOREIGN PATENT DOCUMENTS

CN    104284434 A    1/2015
EP      2950586 A1   12/2015

OTHER PUBLICATIONS

"Dual Connected Intra-frequency Handover for 0 ms Interruption and Mobility Robustness", 3GPP TSG-RAN WG2 #99, R2-1708588, Agenda : 10.2.8, Nokia, Aug. 21-25, 2017, 4 pages.
(Continued)

*Primary Examiner* — Kodzovi Acolatse
(74) *Attorney, Agent, or Firm* — Joseph C. Drish; Harrington & Smith

(57) ABSTRACT

A PCell for a UE participates in a first phase to add a PSCell to a set of cells including the PCell to be used by the UE for a MCHO, comprising determining that the UE is to participate in the MCHO, and sending indications of at least resources for selected ones of multiple candidate cells toward the UE for use for the MCHO. The PCell participates in a second phase to add the PSCell to the set, comprising determining by the PCell which of the selected multiple cells has been accessed by the UE as the PSCell. The PCell participates in a swap from being the PSCell for the UE to becoming a current PSCell for the UE, wherein the PSCell is swapped from the PSCell to being a current PCell for the UE. The current PSCell participates in a release of a connection to the UE.

20 Claims, 10 Drawing Sheets

(56) References Cited

U.S. PATENT DOCUMENTS

| | | | |
|---|---|---|---|
| 2015/0215944 A1* | 7/2015 | Kim | H04L 5/001 370/329 |
| 2015/0223125 A1 | 8/2015 | Lu et al. | |
| 2015/0223270 A1* | 8/2015 | Kim | H04W 56/001 370/329 |
| 2015/0256300 A1 | 9/2015 | Lin et al. | |
| 2015/0365872 A1 | 12/2015 | Dudda et al. | |
| 2016/0227459 A1* | 8/2016 | Fujishiro | H04W 36/28 |
| 2016/0338039 A1* | 11/2016 | Van Der Velde | H04W 76/10 |
| 2017/0055187 A1 | 2/2017 | Kang et al. | |
| 2017/0238252 A1* | 8/2017 | Dalsgaard | H04W 16/32 370/311 |
| 2019/0098543 A1* | 3/2019 | Kim | H04W 36/32 |
| 2019/0253949 A1* | 8/2019 | Park | H04B 7/0695 |
| 2020/0053815 A1* | 2/2020 | Teyeb | H04W 76/11 |
| 2020/0169899 A1* | 5/2020 | Xiao | H04W 76/27 |
| 2020/0169925 A1* | 5/2020 | Li | H04W 76/19 |
| 2020/0252846 A1* | 8/2020 | Ozturk | H04W 74/0808 |
| 2020/0344019 A1* | 10/2020 | Da Silva | H04L 5/0048 |
| 2021/0153082 A1* | 5/2021 | Axmon | H04W 36/0055 |

OTHER PUBLICATIONS

Viering et al., "Zero-Zero Mobility: Intra-Frequency Handovers with Zero Interruption and Zero Failures", IEEE Network, vol. 32, No. 2, Mar.-Apr. 2018, pp. 48-54.

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331, V15.1.0, Mar. 2018, pp. 1-786.

"Conditional Handover—Basic Aspects and Feasibility in Rel-15", 3GPP TSG-RAN WG2 NR Adhoc #2, R2-1706489, Agenda : 10.2.8, Nokia, Jun. 27-29, 2017, 3 pages.

"Conditional Handover", 3GPP TSG-RAN WG2 #97, Tdoc R2-1700864, Agenda : 10.3.1 1.2, Ericsson, Jan. 13-17, 2017, pp. 1-5.

"Scenarios, Requirements and KPIs for 5G Mobile and Wireless-System", Deliverable D1.1, Mobile and wireless communications Enablers for the Twenty-twenty Informationsociety (METIS), Document No. ICT-317669-METIS/D1.1, Apr. 29, 2013, 84 pages.

"Report and Summary of Email Discussion [86#29][LTE/DC] RRM-Measurements", 3GPP TSG-RAN WG2 Meeting #87, R2-143808, Agenda : 7.1.3.2, Huawei, Aug. 18-22, 2014, pp. 1-34.

"Cell Quality Measurement Evaluation using Multiple Beams", 3GPP TSG RAN WG2 NR Adhoc, R2-1700141, Agenda :3.3.1.1.1, Sony, Jan. 17-19, 2017, 5 pages.

"Introduction of Dual Connectivity", 3GPP TSG-RAN WG3 Meeting #85bis, R3-142122, NTT Docomo Inc., Oct. 6-10, 2014, 66 pages.

"3rd Generation Partnership Project; Technical Specification Group Radio Access Network; NG-RAN;Architecture description (Release 15)", 3GPP TS 38.401, V15.1.0, Mar. 2018, pp. 1-23.

"3rd Generation Partnership Project; Technical Specification Group Radio Access Network; NR; Radio Resource Control (RRC) protocol specification (Release 15)", 3GPP TS 38.331, V15.1.0, Mar. 2018, pp. 1-268.

"3rd Generation Partnership Project; Technical Specification Group Radio Access Network; NG-RAN; Xn application protocol (XnAP) (Release 15)", 3GPP TS 38.423, V1.0.0, Jun. 2018, pp. 1-194.

International Search Report and Written Opinion received for corresponding Patent Cooperation Treaty Application No. PCT/US2018/037057, dated Dec. 10, 2018, 23 pages.

Park et al., "Handover Mechanism in NR for Ultra-Reliable Low-Latency Communications", IEEE Network, vol. 32, No. 2, Mar.-Apr. 2018, pp. 41-47.

"3rd Generation Partnership Project; Technical Specification Group Radio Access Network; Evolved Universal Terrestrial Radio Access Network (E-UTRAN); Self-configuring and self-optimizing network (SON) use cases and solutions(Release 9)", 3GPP TR 36.902, V9.3.1, Mar. 2011, pp. 1-21.

* cited by examiner

TWO-STEP ADDITION OF A PRIMARY-SECONDARY CELL, PSCELL, IN A MULTI-CONNECTED HANDOVER

RELATED APPLICATION

This application claims priority to PCT Application No. PCT/US2018/037057 filed Jun. 12, 2018 which is incorporated herein by reference in its entirety.

TECHNICAL FIELD

This invention relates generally to wireless communications, and, more specifically, relates to multi-connected handover (MCHO) such as dual-connected handover (DCHO).

BACKGROUND

Abbreviations that may be found in the specification and/or the drawing figures are defined at the beginning of the detailed description section.

Dual-Connected (e.g., intra-frequency) HandOver (DCHO) has been discussed in 3GPP as a potential technique to improve the handover interruption time and robustness from the baseline single-connected, break-before-make handover of NR. Rel-15. See the following: Nokia, "Dual connected intra-frequency handover for 0 ms interruption and mobility robustness", 3GPP TSG-RAN WG2 #99, R2-1708588, Berlin, Germany, 21-25 Aug. 2017; and I. Viering, H. Martikainen, A. Lobinger, B. Wegmann, "Zero-Zero Mobility: Intra-Frequency Handovers with Zero Interruption and Zero Failures", IEEE Network (Volume: 32, Issue: 2, March-April 2018).

As a user equipment (UE) is connected at least with one cell during the entire dual-connected handover, there is (theoretically) no interruption in the uplink and downlink data transmission. To achieve additional diversity against link failures, data and/or control plane messages can be duplicated over the two links between the two cells. As an alternative to duplication, the user plane links of a user can be switched in a fast manner, selecting the best link at a given time based on UE measurements.

Certain issues can arise for a DCHO, however.

BRIEF SUMMARY

This section is intended to include examples and is not intended to be limiting.

In an exemplary embodiment, a method is performed that comprises participating, by a primary cell for a user equipment, in a first phase to add a primary-secondary cell to a set of cells including the primary cell to be used by the user equipment for a multi-connected handover, the participating in the first phase comprising: determining that the user equipment is to participate in the multi-connected handover; and sending indications of at least resources for selected ones of multiple candidate cells toward the user equipment for use by the user equipment for the multi-connected handover. The method also comprises participating by the primary cell in a second phase to add the primary-secondary cell to the set of cells, the participating in the second phase comprising determining by the primary cell which of the selected multiple cells has been selected and accessed by the user equipment as the primary-secondary cell. The method further comprises participating by the primary cell in a swap from being the primary cell for the user equipment to becoming a current primary-secondary cell for the user equipment, wherein the primary-secondary cell is swapped from the primary-secondary cell to being a current primary cell for the user equipment. The method further comprises participating by the current primary-secondary cell in release of a connection to the user equipment.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An exemplary apparatus includes one or more processors and one or more memories including computer program code. The one or more memories and the computer program code are configured to, with the one or more processors, cause the apparatus to perform at least the following: participating, by a primary cell for a user equipment, in a first phase to add a primary-secondary cell to a set of cells including the primary cell to be used by the user equipment for a multi-connected handover, the participating in the first phase comprising: determining that the user equipment is to participate in the multi-connected handover; and sending indications of at least resources for selected ones of multiple candidate cells toward the user equipment for use by the user equipment for the multi-connected handover; and participating by the primary cell in a second phase to add the primary-secondary cell to the set of cells, the participating in the second phase comprising determining by the primary cell which of the selected multiple cells has been selected and accessed by the user equipment as the primary-secondary cell; participating by the primary cell in a swap from being the primary cell for the user equipment to becoming a current primary-secondary cell for the user equipment, wherein the primary-secondary cell is swapped from the primary-secondary cell to being a current primary cell for the user equipment; and participating by the current primary-secondary cell in release of a connection to the user equipment.

An exemplary computer program product includes a computer-readable storage medium bearing computer program code embodied therein for use with a computer. The computer program code includes: code for participating, by a primary cell for a user equipment, in a first phase to add a primary-secondary cell to a set of cells including the primary cell to be used by the user equipment for a multi-connected handover, the code for participating in the first phase comprising: code for determining that the user equipment is to participate in the multi-connected handover; and code for sending indications of at least resources for selected ones of multiple candidate cells toward the user equipment for use by the user equipment for the multi-connected handover; and code for participating by the primary cell in a second phase to add the primary-secondary cell to the set of cells, the participating in the second phase comprising determining by the primary cell which of the selected multiple cells has been selected and accessed by the user equipment as the primary-secondary cell; code for participating by the primary cell in a swap from being the primary cell for the user equipment to becoming a current primary-secondary cell for the user equipment, wherein the primary-secondary cell is swapped from the primary-secondary cell to being a current primary cell for the user equipment; and code for participating by the current primary-secondary cell in release of a connection to the user equipment.

In another exemplary embodiment, an apparatus comprises: means for participating, by a primary cell for a user equipment, in a first phase to add a primary-secondary cell to a set of cells including the primary cell to be used by the user equipment for a multi-connected handover, the means for participating in the first phase comprising: means for determining that the user equipment is to participate in the multi-connected handover; and means for sending indications of at least resources for selected ones of multiple candidate cells toward the user equipment for use by the user equipment for the multi-connected handover; and means for participating by the primary cell in a second phase to add the primary-secondary cell to the set of cells, the means for participating in the second phase comprising means for determining by the primary cell which of the selected multiple cells has been selected and accessed by the user equipment as the primary-secondary cell; means for participating by the primary cell in a swap from being the primary cell for the user equipment to becoming a current primary-secondary cell for the user equipment, wherein the primary-secondary cell is swapped from the primary-secondary cell to being a current primary cell for the user equipment; and means for participating by the current primary-secondary cell in release of a connection to the user equipment.

In an exemplary embodiment, a method is disclosed that comprises participating, by a user equipment in connection with a primary cell, in a first phase to add a primary-secondary cell to a set of cells including the primary cell to be used by the user equipment for a multi-connected handover, the participating in the first phase comprising: receiving indications of at least resources for multiple candidate cells for use by the user equipment for the multi-connected handover. The method comprises participating by the user equipment in a second phase to add the primary-secondary cell to the set of cells, the participating in the second phase comprising: selecting one of the multiple candidate cells as the primary-secondary cell based on a trigger event; and accessing the primary-secondary cell, using received resources corresponding to the selected one of the multiple candidate cells. The method also comprises participating in a swap causing the primary cell for the user equipment to become a current primary-secondary cell for the user equipment and causing the primary-secondary cell to be swapped from a primary-secondary cell to a current primary cell for the user equipment. The method further comprises participating in release of a connection to the current primary-secondary cell.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An exemplary apparatus includes one or more processors and one or more memories including computer program code. The one or more memories and the computer program code are configured to, with the one or more processors, cause the apparatus to perform at least the following: participating, by a user equipment in connection with a primary cell, in a first phase to add a primary-secondary cell to a set of cells including the primary cell to be used by the user equipment for a multi-connected handover, the participating in the first phase comprising: receiving indications of at least resources for multiple candidate cells for use by the user equipment for the multi-connected handover; participating by the user equipment in a second phase to add the primary-secondary cell to the set of cells, the participating in the second phase comprising: selecting one of the multiple candidate cells as the primary-secondary cell based on a trigger event; and accessing the primary-secondary cell, using received resources corresponding to the selected one of the multiple candidate cells; and participating in a swap causing the primary cell for the user equipment to become a current primary-secondary cell for the user equipment and causing the primary-secondary cell to be swapped from a primary-secondary cell to a current primary cell for the user equipment; and participating in release of a connection to the current primary-secondary cell.

An exemplary computer program product includes a computer-readable storage medium bearing computer program code embodied therein for use with a computer. The computer program code includes: code for participating, by a user equipment in connection with a primary cell, in a first phase to add a primary-secondary cell to a set of cells including the primary cell to be used by the user equipment for a multi-connected handover, the code for participating in the first phase comprising: code for receiving indications of at least resources for multiple candidate cells for use by the user equipment for the multi-connected handover; code for participating by the user equipment in a second phase to add the primary-secondary cell to the set of cells, the code for participating in the second phase comprising: code for selecting one of the multiple candidate cells as the primary-secondary cell based on a trigger event; and code for accessing the primary-secondary cell, using received resources corresponding to the selected one of the multiple candidate cells; and code for participating in a swap causing the primary cell for the user equipment to become a current primary-secondary cell for the user equipment and causing the primary-secondary cell to be swapped from a primary-secondary cell to a current primary cell for the user equipment; and code for participating in release of a connection to the current primary-secondary cell.

In another exemplary embodiment, an apparatus comprises means for participating, by a user equipment in connection with a primary cell, in a first phase to add a primary-secondary cell to a set of cells including the primary cell to be used by the user equipment for a multi-connected handover, the means for participating in the first phase comprising: means for receiving indications of at least resources for multiple candidate cells for use by the user equipment for the multi-connected handover; means for participating by the user equipment in a second phase to add the primary-secondary cell to the set of cells, the means for participating in the second phase comprising: means for selecting one of the multiple candidate cells as the primary-secondary cell based on a trigger event; and means for accessing the primary-secondary cell, using received resources corresponding to the selected one of the multiple candidate cells; and means for participating in a swap causing the primary cell for the user equipment to become a current primary-secondary cell for the user equipment and causing the primary-secondary cell to be swapped from a primary-secondary cell to a current primary cell for the user equipment; and means for participating in release of a connection to the current primary-secondary cell.

DETAILED DESCRIPTION OF THE DRAWINGS

Figure 1:
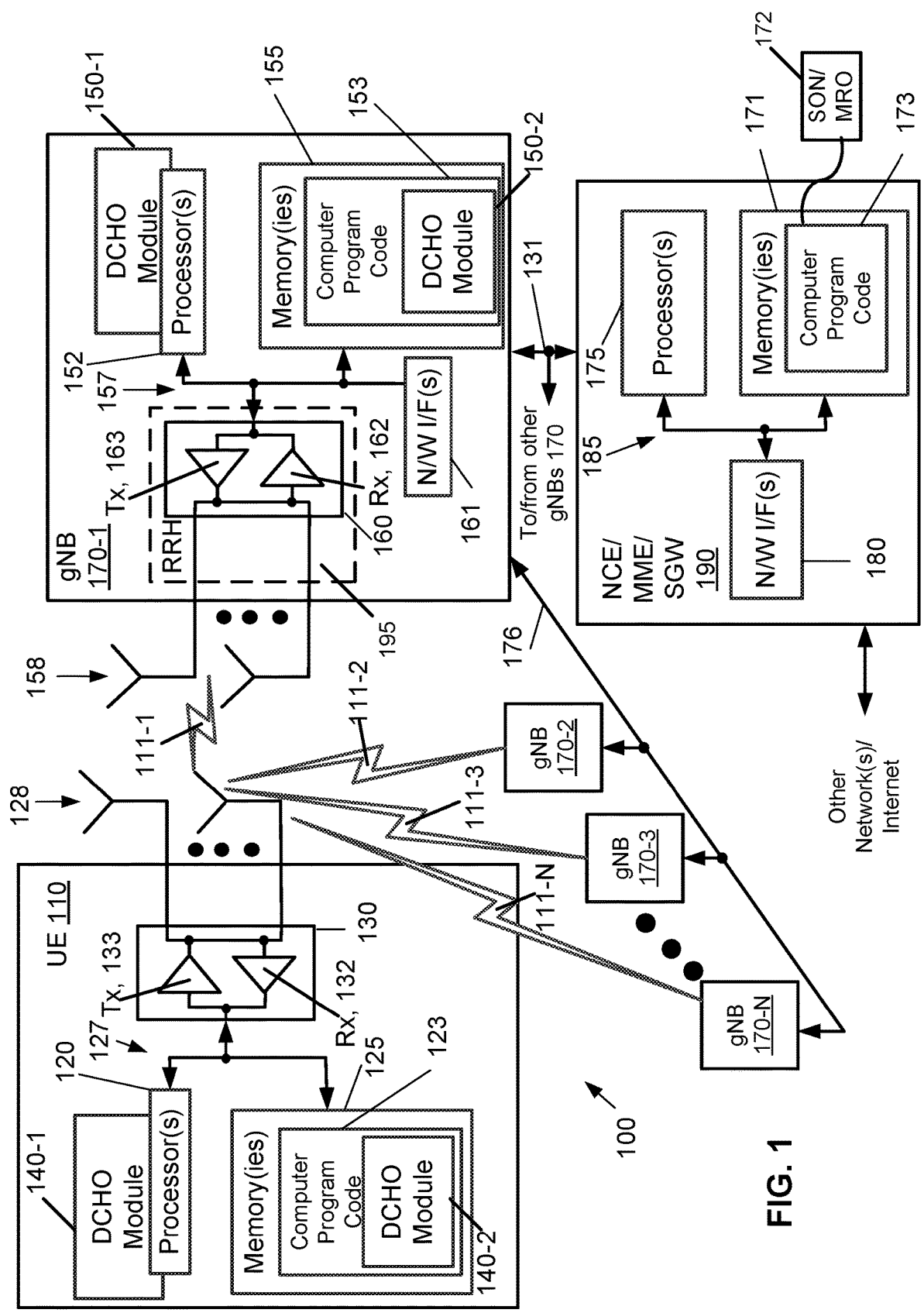
FIG. 1 is a block diagram of one possible and non-limiting exemplary system in which the exemplary embodiments may be practiced.

The following abbreviations that may be found in the specification and/or the drawing figures are defined as follows:

% percent
3GPP third generation partnership project
5G fifth generation
ACK acknowledge
ADD an addition procedure, which adds a cell to a set of candidate primary-secondary cells used for dual connectivity
AS active set (or active set size)
BLER block error rate
CHO conditional handover
CU centralized unit
dB decibels
DC dual connected (or dual connectivity)
DCHO dual connected handover
DU distributed unit
eNB (or eNodeB) evolved Node B (e.g., an LTE base station)
gNB (or gNodeB) base station for 5G/NR
I/F interface
LTE long term evolution
MBB mobile broadband
MCHO multi-connected handover
MgNB master gNB
MME mobility management entity
MR measurement report
MRO Mobility Robustness Optimization
NCE network control element
NR new radio
N/W or NW network
PCell Primary Cell
PSCell Primary-Secondary Cell
RA random access
RAN Radio Access Network
Rel release
RLF Radio Link Failure
RLM Radio Link Monitoring
RRC Radio Resource Control
RRH remote radio head
RSRP Received Signal Reference Power
RSRQ Received Signal Reference Quality
Rx or RX receiver
SgNB secondary gNB
SGW serving gateway
SINR Signal and Interference to Noise Ratio
SON Self-Organizing Network
SRB Signaling Radio Bearer
S-RLF Secondary Radio Link Failure
TS Technical Specification
TSG Technical Specification Group
TTT Time To Trigger
Tx or TX transmitter
UE user equipment (e.g., a wireless, typically mobile device)
URLLC Ultra-Reliable Low-Latency Communications
WG Working Group The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The exemplary embodiments herein describe techniques for two-step addition of a PSCell in dual-connected handover. Additional description of these techniques is presented after a system into which the exemplary embodiments may be used is described.

Turning to FIG. 1, this figure shows a block diagram of one possible and non-limiting exemplary system in which the exemplary embodiments may be practiced. In FIG. 1, a user equipment (UE) 110 is in wireless communication with a wireless network 100. A UE is a wireless, typically mobile (meaning the device can move) device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a dual connected handover (DCHO) module 140, comprising one of or both parts 140-1 and/or 140-2, which may be implemented in a number of ways. The DCHO module 140 may be implemented in hardware as DCHO module 140-1, such as being implemented as part of the one or more processors 120. The DCHO module 140-1 may be implemented also as an integrated circuit or through other hardware such as a programmable gate array. In another example, the DCHO module 140 may be implemented as DCHO module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein.

The UE 110 communicates with N gNBs 170-1, 170-2, 170-3, . . . , 170-N via corresponding wireless links 111-1, 111-2, 111-3, . . . , 111-N. Each gNB 170 is a base station that provides access by wireless devices such as the UE 110 to the wireless network 100. The gNBs 170 are base stations for 5G, also called New Radio (NR). One or more of the gNBs 170 may also be an eNB (evolved NodeB) base station, for LTE (long term evolution), or any other suitable base station or other network element.

One possible internal organization of one of the gNBs 170-1 is shown, and the other gNBs 170 are considered to be similar. The example of gNB 170-1 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The gNB 170-1 includes a DCHO module 150, comprising one of or both parts 150-1 and/or 150-2, which may be implemented in a number of ways. The DCHO module 150 may be implemented in hardware as DCHO module 150-1, such as being implemented as part of the one or more processors 152. The DCHO module 150-1 may be implemented also as an integrated circuit or through other hardware such as a programmable gate array. In another example, the DCHO module 150 may be implemented as DCHO module 150-2, which is implemented as computer program code 153 and is executed by the one or more processors 152. For instance, the one or more memories 155 and the computer program code 153 are configured to, with the one or more processors 152, cause the gNB 170-1 to perform one or more of the operations as described herein. The one or more network interfaces 161 communicate over a network such as via the links 176 and 131. Two or more gNBs 170 communicate using, e.g., link 176. The link 176 may be wired or wireless or both and may implement, e.g., an Xn interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the gNB 170-1 being physically in a different location from the RRH, and the one or more buses 157 could be implemented in part as fiber optic cable to connect the other elements of the gNB 170 to the RRH 195.

It is noted that description herein indicates that "cells" perform functions, but it should be clear that the gNB that forms the cell will perform the functions. The cell makes up part of a gNB, That is, there can be multiple cells per gNB. For instance, there could be three cells for a single gNB carrier frequency and associated bandwidth, each cell covering one-third of a 360 degree area so that the single gNB's coverage area covers an approximate oval or circle. Furthermore, each cell can correspond to a single carrier and a gNB may use multiple carriers. So if there are three 120 degree cells per carrier and two carriers, then the gNB has (e.g., hosts) a total of six cells.

The wireless network 100 may include a network control element (NCE) 190 that may include MME (Mobility Management Entity)/SGW (Serving Gateway) functionality, and which provides connectivity with a further network, such as a telephone network and/or a data communications network (e.g., the Internet). The gNBs 170 are coupled via links 131 to the NCE 190. The links 131 may be implemented as, e.g., an NG interface (see 3GPP 38.401 chapter 6.1), or an S1 interface for LTE, or other suitable interface for other standards. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations. Note that the computer program code 173 may include SON and/or MRO functionality 174. This could be the case for a centralized SON/MRO functionality. This functionality may also be distributed, e.g., to the computer program code 173 and also to the computer program code 153 in the gNBs 170.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, gNB 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Having thus introduced one suitable but non-limiting technical context for the practice of the exemplary embodiments of this invention, the exemplary embodiments will now be described with greater specificity.

As stated above, DCHO has been discussed in 3GPP as a potential technique to improve the handover interruption time and robustness from the baseline single-connected, break-before-make handover of NR Rel-15. See the following: Nokia, "Dual connected intra-frequency handover for 0 ms interruption and mobility robustness", 3GPP TSG-RAN WG2 #99, R2-1708588, Berlin, Germany, 21-25 Aug. 2017; and I. Viering, H. Martikainen, A. Lobinger, B. Wegmann, "Zero-Zero Mobility: Intra-Frequency Handovers with Zero Interruption and Zero Failures", IEEE Network (Volume: 32, Issue: 2, March-April 2018). The 0 ms (zero millisecond) user plane interruption for MBB is specified in IMT-2020 requirements for 5G systems. The basic principle of DCHO is illustrated in FIG. 2.

Figure 2:
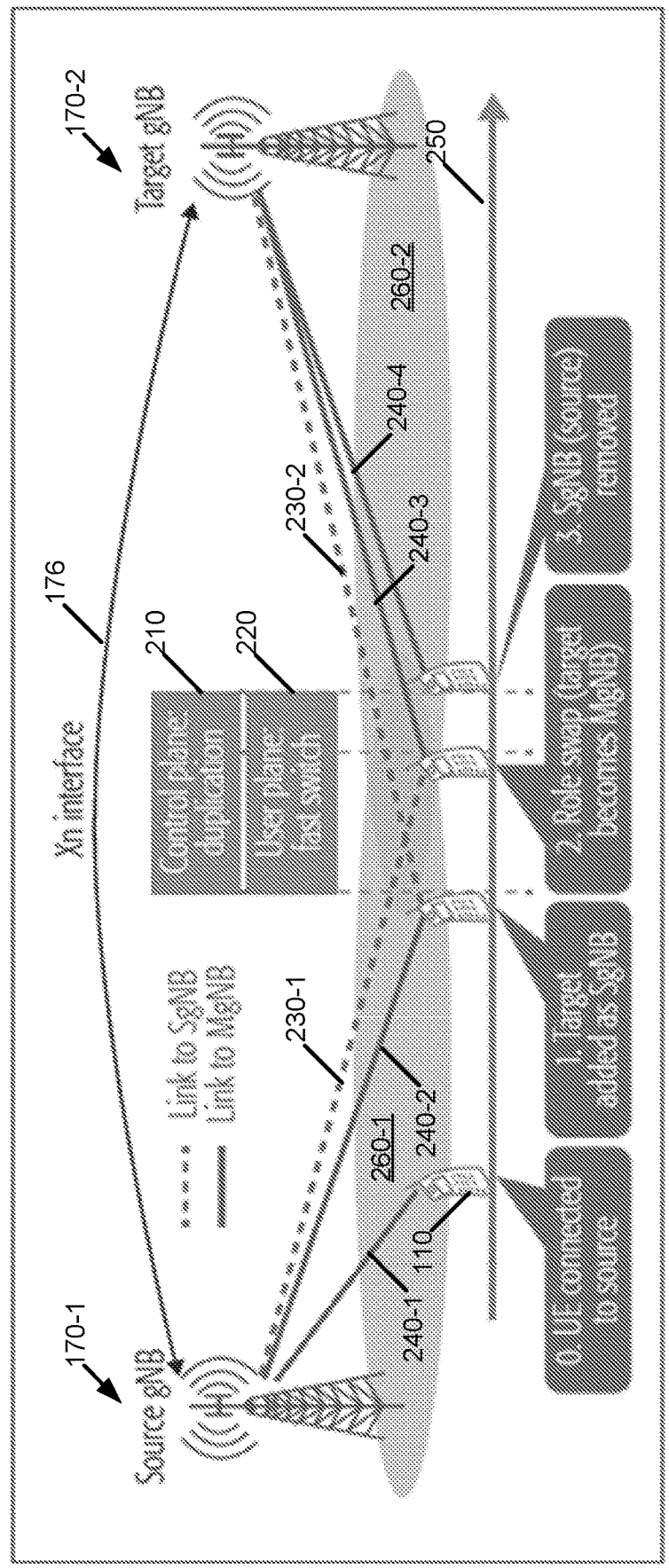
FIG. 2 illustrates dual connected intra-frequency handover, and is a modified version of a figure from I. Viering, H. Martikainen, A. Lobinger, B. Wegmann, "Zero-Zero Mobility: Intra-Frequency Handovers with Zero Interruption and Zero Failures", IEEE Network (Volume: 32, Issue: 2, March-April 2018)

Turning to FIG. 2, this figure illustrates dual connected intra-frequency handover, and is a modified version of a figure from I. Viering, H. Martikainen, A. Lobinger, B. Wegmann, "Zero-Zero Mobility: Intra-Frequency Handovers with Zero Interruption and Zero Failures", IEEE Network (Volume: 32, Issue: 2, March-April 2018). This figure illustrates a source gNB 170-1 (also called a master gNB, MgNB, and a primary cell, PCell) creating a first cell 260-1, while the target gNB 170-2 (also called a secondary gNB, SgNB, and a primary-secondary cell, PSCell) creates a second cell 260-2. The UE 110 moves along a pathway 250 from a location nearer to the source gNB 170-1 (at step 0) and in cell 260-1, to a final location nearer to the target gNB 170-2 and in cell 260-2 (at step 3).

The basic steps of a DCHO are as follows. Note that there are four steps, labeled 0 (zero) through 3. The links 230-1 and 230-2 between the UE 110 and the corresponding SgNB at the time of the step are shown, as are the links 240-1, 240-2, 240-3, and 240-4 between the UE 110 and the corresponding MgNB at the time of the step.

Step 0. The UE 110 is single-connected (via link 240-1) with the source gNB 170-1 (PCell).

Step 1. Upon a trigger event, the target gNB 170-2 is added as a secondary gNB (SgNB) following an ADD procedure. After this step, the UE 110 is dual connected with the source node (170-1) and target node (170-2) (PCell and PSCell, respectively) via the links 240-2 and 230-2, respectively.

Step 2. Upon a trigger event, the roles of MgNB and SgNB are switched following a SWAP procedure, i.e., the target becomes MgNB and the source becomes SgNB and the UE 110 is dual connected with the source node (170-2) and target node (170-1) (PCell and PSCell, respectively) via the links 240-3 and 230-1, respectively.

Step 3. Upon a trigger event, the handover source node (170-1) is removed following a REMOVE procedure. After this step, the UE is single connected with the target gNB 170-2 via the link 240-4.

As the UE 110 is connected at least with one cell during the entire handover, there is (theoretically) no interruption in the uplink and downlink data transmission. To achieve additional diversity against link failures, data and/or control plane messages can be duplicated over the two links. As an alternative to duplication, the user plane links of a user can be switched in a fast manner, selecting the best link at a given time based on UE measurements.

The elementary properties of DCHO are the following:
1) DCHO requires at least two RX/TX chains.
2) DCHO enables close to zero service interruption during handover.
3) DCHO improves the handover robustness in a significant manner compared to legacy handover.

Figure 3:
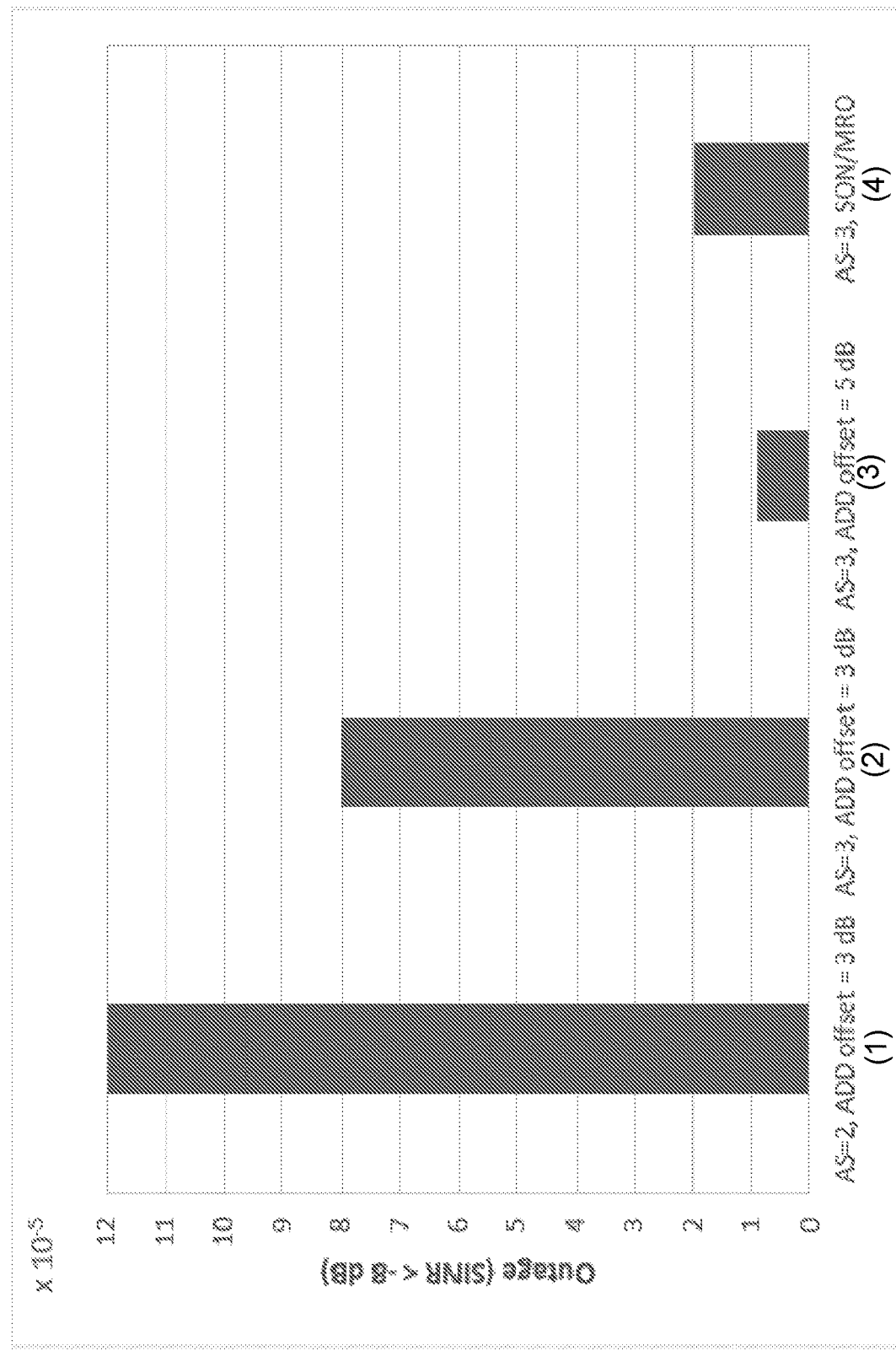
FIG. 3 illustrates a diagram of probability of an outage (SINR<-8 dB) for the following cases: (1) active set size (AS)=2, ADD offset=3 dB, (2) active set size (AS)=3, ADD offset=3 dB, (3) active set size (AS)=3, ADD offset=5 dB, and (4) active set size (AS)=3, cell specific ADD optimization, i.e., SON/MRO.

Consequently, DCHO can potentially fulfill the minimum URLLC requirements (zero latency, 99.999% reliability). Potentially, because radio link failures are still possible when the ADD (addition) of the target node is initiated too late and fails due to broken source link. Such failures are illustrated in FIG. 3, which shows the probability of an outage (defined as SINR<−8 dB) for DCHO with SRB duplication in a METIS Madrid Scenario. The METIS Madrid Scenario is described in METIS, "Scenarios, requirements and KPIs for 5G mobile and wireless system", ICT-317669, April 2013. In FIG. 3, outage results are shown for the following cases: (1) active set size (AS)=2, ADD offset=3 dB, (2) active set size (AS)=3, ADD offset=3 dB, (3) active set size (AS)=3, ADD offset=5 dB, and (4) active set size (AS)=3, cell specific ADD optimization, i.e., SON/MRO. As can be seen, DCHO cannot meet the minimum URLLC requirements in, e.g., the case of "AS=2, ADD offset=3 dB", mainly due to failed ADDs. That is, the outages would have to be less than 1 on the graph, and in practice even less due to mismatch of the outage and reliability definitions. For instance, the impact of fast fading causes some additional margin to be needed.

However, some options exist to further improve the robustness of the baseline DCHO. These options are described as follows.

1. More than two simultaneous links: From simulation results, the inventors have observed that three simultaneous links will improve the DCHO performance. See FIG. 3, e.g., the "AS=3, ADD offset=3 dB" case. However, this still does not fulfill the URLLC requirement in the given scenarios, as the probability of an outage is still too high. Furthermore, three simultaneous links would require 3 RX/TX chains, introducing a substantial burden to terminal implementation.

2. Earlier ADD: From simulation results performed by the inventors, it was observed that an earlier ADD can significantly improve the outage, reaching 0.001% when the target is added when the target is 5 dB worse than the source. See, e.g., the "AS=3, ADD offset=5 dB" case in FIG. 3. However, this improvement comes with a dramatic increase of the active set operations, especially for slowly moving UEs. It should be also noted that the 0.001% outage does not correspond to 99.999% reliability (the minimum URLLC requirement) due to impact of fast fading, but some additional margin is needed. Also, the 0.001% outages are only achieved with three simultaneous links.

3. Cell pair specific ADD optimization: From simulation results performed by the inventors, it is observed that by optimizing the ADD trigger in a cell pair specific manner (e.g., via SON/MRO) one can achieve almost the full outage gain from the earlier add with a minimal increase in the number of active set operations. See the "AS=3, SON/MRO" case in FIG. 3.

From the above, it is observed that the baseline DCHO may not be able to provide URLLC grade robustness in all network scenarios. The residual problems include the following.

Problem 1: A typical UE is expected to have only up to two intra-frequency RX/TX chains, due to cost, complexity, and interference reasons. Hence, the robustness benefit from more than two chains is not available for a typical UE.

Problem 2: A target cell cannot be added arbitrarily early. At a minimum, a cell needs to be detected before the cell can be added.

Problem 3: Adding a target cell too early leads to a failed random access and a PSCell failure, abortion of the ADD procedure, and finally a new ADD procedure after recovering from the secondary RLF. Such ADD/failure cycles repeat until the random access succeeds, increasing the signaling overhead.

Problem 4: Even if the target cell could be added right after the cell was detected, there is some delay until the cell can be used for the data transmission. This delay comprises the following components:

1. The UE triggers a measurement report (MR), comprising L1 filtering, L3 filtering, and TTT.
2. The UE sends the MR to the PCell.
3. The source node (e.g., PCell) sends an SgNB addition message to the target node (e.g., PSCell).
4. The target node runs admission control, reserves resources, and prepares an RRC configuration for UE.
5. The target node sends an SgNB addition ACK message to the source node.
6. The source node forwards the RRC configuration to the UE.
7. The UE starts a random access procedure to PSCell according to the received RRC configuration.

Due to the above delays, the UE 110 may experience outage (violating the URLLC requirement) in a scenario where the target cell appears at an extreme rate while the source cell at the same time decays at an extreme rate. One example of such scenario would be a UE passing a building corner at a millimeter wave band.

While DCHO is being discussed as a potential enhancement for NR Rel-16, dual-step addition of the target PSCell has not been mentioned in any public references. Instead, all contributions refer to a single-step ADD that is used for example in the inter-frequency dual-connectivity feature of LTE. See 3GPP TS 36.331 V15.1.0 (2018-03). More precisely, with "single-step ADD" we refer to the natural solution, known from LTE DC, where the UE accesses the PSCell (see component #7 above) immediately after receiving the RRC configuration (see component #6 above).

Another enhancement discussed in 3GPP for NR Rel-16 is the Conditional Handover (CHO). See the following: Nokia, Alcatel-Lucent Shanghai Bell, "Conditional handover—basic aspects and feasibility in Rel-15", 3GPP TSG-RAN WG2 NR Adhoc #2, R2-1706489, Qingdao, China, 27-29 Jun. 2017; and Ericsson, "Conditional Handover", 3GPP TSG-RAN WG2 #97, Tdoc R2-1700864, Athens, Greece, 13-17 Jan. 2017. It is observed that CHO can increase robustness against failures but this type of handover does not resolve the handover interruption, and thus is not a solution for low latency services. Therefore, in the proposed exemplary embodiments described below, the CHO is not a procedural sub-component of 2-step DCHO. From a protocol perspective, the CHO has different functionality compared to proposed exemplary embodiments, and the related signaling of information elements between each transmitting and receiving nodes is different.

The proposed techniques described below aim at solving and/or mitigating problems 1-4 described above.

In this document, we propose exemplary techniques for improving the efficiency and robustness of the DCHO of 3GPP New Radio (NR). One exemplary method carries out an addition of a Primary Secondary Cell (PSCell) in two steps instead of one. The steps for DCHO comprise the following:

Step 1: Prepare (e.g., by the network, with informing the UE) a set of candidate PSCells (see components #1-#6 in the description above); and Step 2: Access (e.g., by a UE) one of the prepared PSCells (see component #7 described above).

Together, steps 1 and 2 jointly correspond to a full ADD procedure.

The separation of step 1 and step 2 would be realized by an additional condition, i.e., step 2 would not follow immediately on step 1 (as in the legacy procedure), but instead implementing step 2 would be subject to a condition. Reasoning for this separation is the observation that step 1 does not involve any communication by the UE with the target cell, and thus can be initiated extremely early, earlier than with the legacy procedure, and even before the target has been identified. On the other hand, step 2 does not involve communication by the UE with the source and thus can be executed even if the radio conditions in the source are already risky.

We furthermore propose, in certain exemplary embodiments, an optimized access procedure that exploits the two-step ADD method. Exemplary features of this aspect include one or more of the following:

a) While carrying out access to the initial PSCell candidate, the UE 110 may monitor the quality of the PCell and other PSCell candidates. In case these measurements satisfy a configured criterion, the UE may abort the current access attempt and initiate an access to a PSCell candidate with a better quality.

b) When reaching a maximum number of random access attempts, the UE may start accessing a suitable PSCell candidate.

c) Upon S-RLF, the network may instruct the UE to continue access attempts to other suitable candidate PSCells.

The CHO references described above (see R2-1706489, "Conditional handover—basic aspects and feasibility in Re-15"; and R2-1700864, "Conditional Handover") may be used to illustrate that the 2-step CHO procedure leads to a handover (cell change). By contrast, the features of the proposed 2-step DCHO procedures lead to an addition of a PSCell with the benefits described below. These benefits are not available with CHO.

It is noted that most of the disclosure herein concerns DCHO, as this is a likely scenario. The techniques herein, however, may be extended to three or more cells, in a multi-connected scenario, such that a UE 110 is connected to multiple PSCells for a multi-connected handover.

Figure 4:
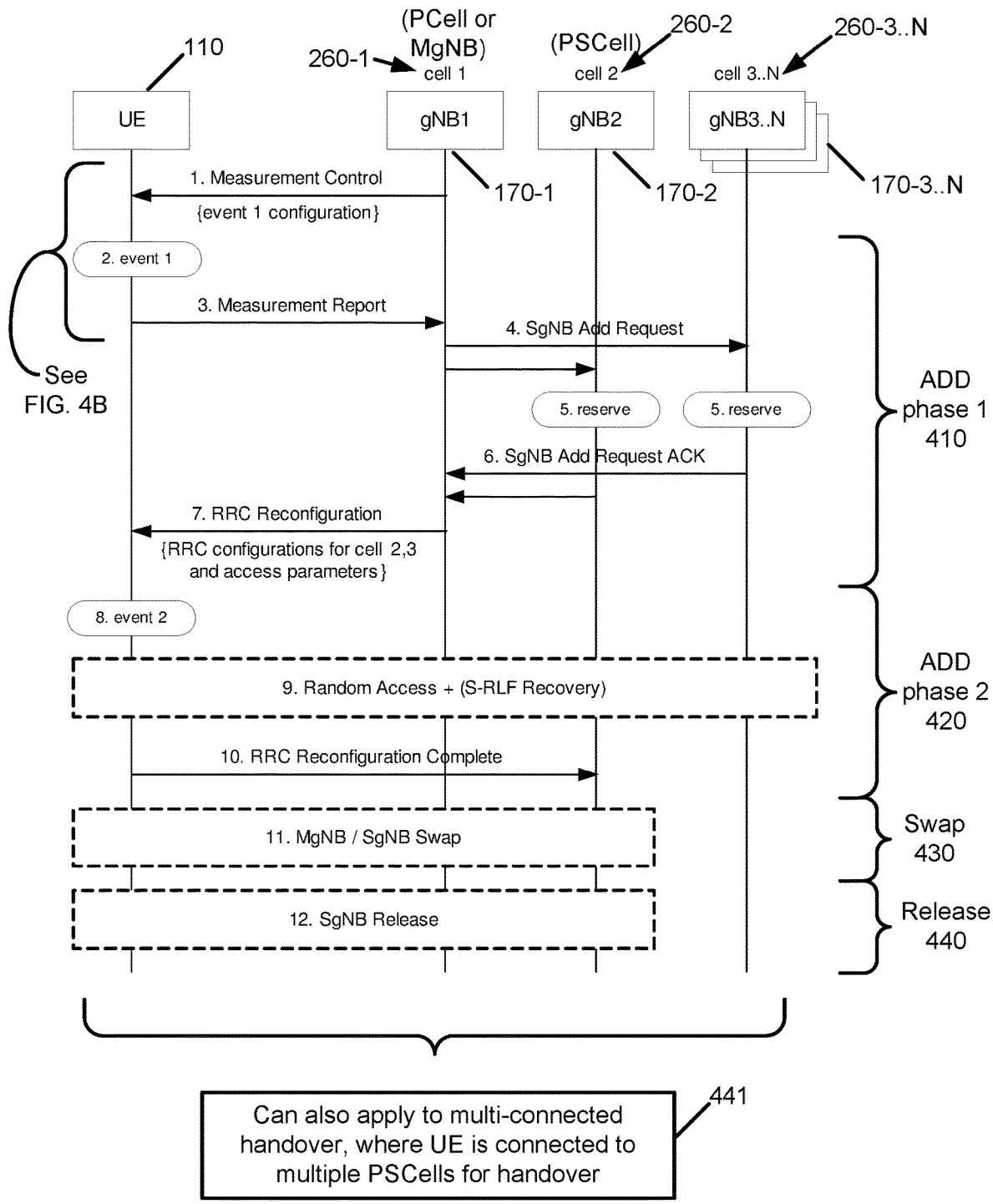
FIG. 4 is a signaling diagram illustrating 2-step addition of a target PSCell, in accordance with an exemplary embodiment.

A detailed procedure utilizing 2-step addition of the target PSCell is shown in FIG. 4. FIG. 4 is a signaling diagram illustrating a 2-step addition of a target PSCell, in accordance with an exemplary embodiment. Signaling is shown between the UE 110 and gNB 170-1 (e.g., hosting the cell 260-1, e.g., the PCell), gNB 170-2 (e.g., hosting the cell 260-2, the PSCell after ADD phase 2), and other gNBs 170-3 to 170-N (hosting respective cells 260-3 through 260-N). Initially, the UE 110 is single-connected to cell 1 (PCell) hosted by gNB1 170-1 (also referred to as the MgNB or serving gNB). Some or all of the cells 260-2 through 260-N may be referred to as candidate cells in the description below.

In step 1, the serving gNB 170-1 sends a Measurement Control message to the UE 110. This message contains a condition for the UE to trigger a measurement report (shown as "event 1 configuration"), the condition being met would initiate the Add Phase 1 410. This event could be any of the standard events specified for NR, for example the RSRP-based A3 event (e.g., this event is triggered, e.g., when RSRP for a neighboring cell becomes better than RSRP of the serving cell by an offset; see also 3GPP TS 38.331 for a more detailed description), or a specific ADD or REPLACE event taking into account the already-configured candidate PSCell(s). The event might be configured to trigger earlier than the standard PSCell Add event in a one-step DCHO.

In step 2, the configured event (event 1) triggers for PSCell candidates 2 . . . N (e.g., cells 260-2 to 260-N). In step 3, the UE 110 sends a Measurement Report message to serving gNB 170-1. The report contains measurements for the cell that triggered the event, and possibly for other suitable PSCell candidates.

In another embodiment (replacing steps 1-3), the Add Phase 1 is initiated based on a network-side trigger, for example based on a priori information about the route of the UE. For instance, the network might have determined that a UE on a particular route could have particular candidate cells 260 of specific gNBs 170. Measurement reports might not be necessary in this example. Network-side triggers may also include, e.g., a priori knowledge of the UE speed, and a priori knowledge of the propagation channel, as additional examples of quantities that the serving gNB can obtain by the means of predictive techniques.

Figure 4A:
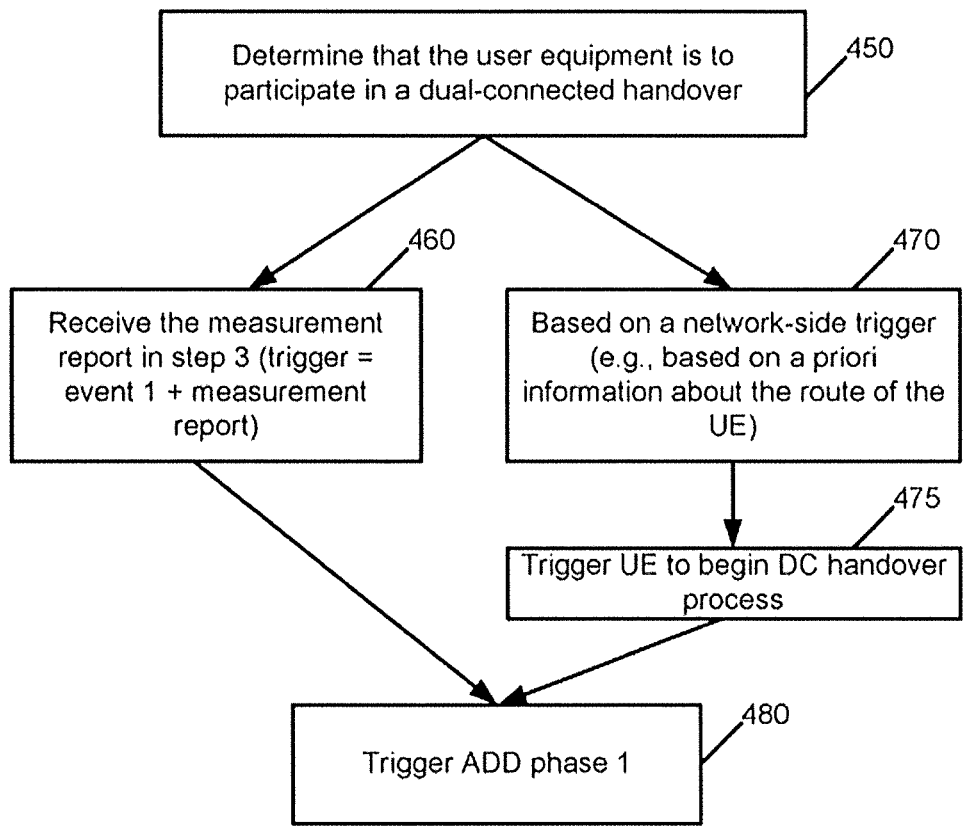
FIG. 4A is a logic flow diagram performed by a network element for triggering a first phase to add a cell as a PSCell.

Referring to FIG. 4A, this figure is a logic flow diagram performed by a network element for triggering a first phase to add a cell as a PSCell. In this example, the gNB 170-1 determines in block 450 that the UE 110 is to participate in a dual-connected handover. This could be by receiving the measurement report in step 3 (see block 450). Alternatively, in block 470, this could be based on a network-side trigger (e.g., based on a priori information about the route of the UE). The gNB 170-1 then in block 475 triggers the UE (e.g., via a message) to begin a DC handover process. The flow from each of blocks 460 and 475 proceeds to block 480, where the gNB 170-1 triggers ADD phase 1 420.

Returning to FIG. 4, in step 4, the serving gNB 170-1 triggers the ADD phase 1 410 and sends a SgNB Add Request message to potential PSCell candidates, in this case cells 260-2 (hosted by gNB 170-2) through 260-N (hosted by gNB 170-N). Besides the usual information in this message, the message contains an indication that the ADD will be carried out in two phases, in accordance with an exemplary embodiment, allowing the candidate PSCell to prepare accordingly.

With respect to step 5, the candidate gNB(s) 170-2 through 170-N run admission control and reserve resources ("reserve" in the blocks) for the potential UE access.

In step 6, the candidate gNB(s) 170-2 through 170-N respond to the serving gNB 170-1 with an SgNB Add Request ACK message. This message contains an RRC configuration (including, e.g., contention free resources) to be applied in case the UE should access a given candidate PSCell. It is noted that all candidate gNBs should reply something to an SgNB Add Request. As with the regular dual-connectivity ADD procedure, they may also choose to reject the request (e.g., an S-NODE ADDITION REQUEST REJECT in 3GPP TS 38.423) in case for some reason the UE cannot be admitted to the requested cell.

The serving gNB 170-2, in step 7, sends an RRC Reconfiguration message to the UE 110. This message contains RRC configuration(s) for the prepared candidate PSCell(s), the access trigger (event 2, which initiates step 2, shown as ADD phase 2 420), and specific access control parameters (see Step 9 for examples access procedures and failure mechanisms). In this example the prepared candidate PSCells include cell 2 260-2 and cell 3 260-3. It is assumed that cells 2, 3 are prepared, as most of the gain in practice comes from a relatively small candidate set, e.g., 1-2 prepared candidate cells. However, in principle, any number of candidate cells could be prepared for PSCell access.

In another embodiment, steps 1-7 could be repeated for another candidate gNB, in case it is considered a relevant candidate as well. For instance, steps 1-7 could be first performed for N candidate cells, and then again for M candidate cells. All possible options for managing the set of candidate cells are not shown in this figure, as at least some of these are assumed as known techniques. For example, one candidate cell could be replaced by another one based on a UE trigger, or one or more candidate cells could be removed based on a UE or network trigger.

In step 8, the configured event (event 2) triggers for cell 2 (or another candidate that has been prepared). This event could be any of the standard events specified for NR, e.g., RSRP-based A3. The trigger causes and is part of the ADD phase 2 420. The trigger could be for any of the cells 2 to N that have been prepared based on the RRC Reconfiguration message in step 7.

The UE 110, in step 9, sends random-access preamble(s) to cell 2 260-2 according to a configured maximum number of random access attempts. The figure illustrates that this step 9 might involve any of the PCell 270-1 and the candidate cells 2 260-2 through N 260-N.

It is noted that during steps 1-3, the current PCell does not necessarily need to assume any particular use case for cell preparation, i.e., a common trigger could be used, e.g., for conditional handover (CHO) and DCHO. Already in Step 4, however, the network needs to decide whether it is to use CHO or DCHO, because that intention needs to be signaled to the target node. Furthermore, the UE needs to be prepared specifically for dual-connectivity in step 7. So the PCell knows in step 9 that dual-connectivity is being used.

As described above and also illustrated by block 441, the techniques herein such as in FIG. 4 and the other figures, can also apply to a multi-connected handover. A multi-connected handover is where the UE is connected to multiple PSCells for handover. Conceptually, there is not that much difference between a UE being connected to one or multiple PSCells, i.e., the UE can be scheduled according to a chosen strategy (e.g., fast link switching or data duplication) via each connected PSCell. The reason for allowing more than one active PSCell could be, e.g., to reduce the number of active set operations, such as adding, replacing, or removing a PSCell. Also, having more than one PSCell connection might provide additional macroscopic diversity during a handover and improve the user data rate.

In one embodiment, during a process including sending the random-access preambles, the UE monitors the quality of source PCell and target PSCell(s) according to a configured criterion (e.g., RSRP-A3). In response to the quality of a target PSCell being an offset above the quality of the source PCell, the UE 110 aborts the ongoing access attempt and initiates a new access attempt to the PSCell candidate that fulfilled the condition, resetting the RA attempt counter.

In another embodiment, during a process including sending the random-access preambles, the UE monitors the source cell BLER, or some other source cell quality measure. In response to the quality of the source cell being below a configured threshold, and the quality of at least one candidate PSCell being above a configured threshold, the UE 110 aborts the ongoing access attempt and initiates a new access attempt to the candidate PSCell with a best quality, resetting the RA attempt counter. In response to the source cell quality being below a configured threshold for a prolonged time (e.g., a configured time), and the quality of none of the candidate PSCells being above a configured threshold, T310 (timer 310) will (e.g., likely) start, triggering a PCell RLF, and ultimately a re-establishment procedure.

In response to the configured maximum number of RA attempts being reached on the current target PSCell:

1) In response to the quality of at least one of the candidate PSCells being above a configured threshold, the UE 110 initiates a new access attempt to the candidate PSCell with a best quality.

2) In response to the quality of none of the candidate PSCells being above a configured threshold, the UE indicates a failed PSCell access to the Master gNB 170 (gNB 170-1). Based on this indication, the MgNB may configure a new access trigger to the UE 110, possibly with a later trigger condition. A later trigger condition refers to a condition where the target PSCell needs to be better by some quality measurement, compared to the original access attempt, e.g., an RSRP-A3 with a higher offset. As another option, the MgNB may instruct the UE to continue its attempts, possibly signaling new parameters to control the access (e.g., a maximum number of attempts and periodicity).

In step 10, the UE 110 sends a RRC Reconfiguration Complete message to the target gNB (gNB 2, 170-2, in the example). The UE is dual-connected to cell 1 26-1 (PCell) and to cell 2 160-2 (PSCell), and this occurs at the completion of ADD phase 2 420.

In step 11, the roles of MgNB and SgNB are swapped according to a standardized procedure. This occurs in swap 430. The UE is therefore dual-connected to cell 2 260-2 (PCell) and cell 1 260-2 (PSCell) after the swap 430.

The SgNB 170-1, in step 12, is released according to a standardized procedure. This occurs in release 440. The UE 110 is single-connected to cell 2 260-2 (PCell) after the release 440.

While there is no established terminology in 3GPP, a dual-connected (or multi-connected) handover likely refers to a whole procedure, i.e., ADD phase 1 410, ADD phase 2 420, swap 430, and release 440. Following that terminology, the figures below assume that a dual-connected or multi-connected handover is the entire procedure from configuring of a UE with trigger(s) for sending measurement reports, until the UE 110 has been handed over.

Figure 5:
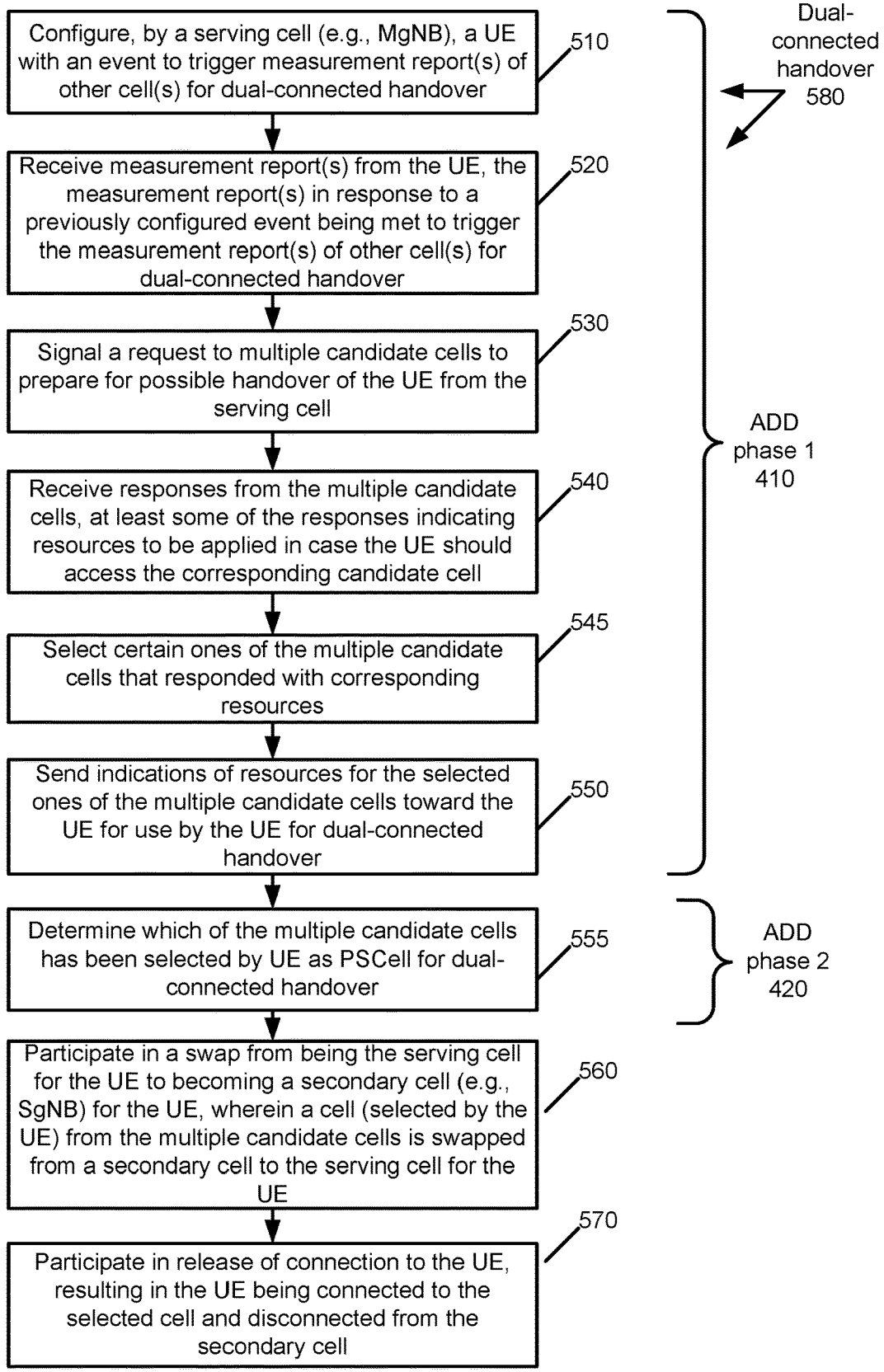
FIG. 5 is a logic flow diagram performed by a network element for two-step addition of a PSCell in dual-connected handover, in accordance with exemplary embodiments.

Turning to FIG. 5, this figure is a logic flow diagram performed by a network element for two-step addition of a PSCell in dual-connected handover. This figure also illustrates the operation of an exemplary method or methods, a result of execution of computer program instructions embodied on a computer readable memory, functions performed by logic implemented in hardware, and/or interconnected means for performing functions in accordance with exemplary embodiments. In the description below, the network element is assumed to be the gNB 170-1 (or another gNB 170), but other variations are possible. For instance, the invention would be also applicable to so called CU/DU (centralized unit/distributed unit) architecture (see FIG. 6.1-1 of 3GPP TS 38.401) but there the message flow would be slightly different, as control-plane messages go though DUs and one RRC entity controls multiple DUs (cells). The DCHO module 150 may include multiples ones of the blocks in FIG. 5, where each included block is an interconnected means for performing the function in the block. The blocks in FIG. 5 are assumed to be performed by a base station such as gNB 170, e.g., under control of the DCHO module 150 at least in part.

The dual-connected handover 580 is illustrated as being the entire process in FIG. 5. It is noted the handover 580 might be some portion of this process, too, depending on how a dual-connected (or multi-connected) handover is ultimately established in 3GPP.

In block 510, a serving cell (e.g., a gNB 170-1, also referred to as an MgNB) configures a UE 110 with an event to trigger measurement report(s) of other cell(s) for dual-connected handover. It is noted that a cell would trigger one measurement report, but that measurement report could contain also measurements for cells that did not trigger the report. The network could then, based on those results, decide to prepare also some additional cells, not just the cell that triggered the report. However, in a typical case, probably only one cell (that triggered the report) would be prepared. In block 520, the gNB 170-1 receives measurement report(s) from the UE 110, the measurement report(s) in response to a previously configured event being met to trigger the measurement report(s) of other cell(s) for dual-connected handover. In block 530, the gNB 170-1 signals a request to multiple candidate cells to prepare for possible handover of the UE from the serving cell. See also step 4 in FIG. 4.

The gNB 170-1, in block 540, receives responses from the multiple candidate cells, the responses indicating resources to be applied in case the UE should access the corresponding candidate cell. See also steps 5 and 6 in FIG. 4. Note that some of the cells that were contacted in block 530 might not respond with resources, and instead could decline the request. In block 545, the gNB 170-1 selects certain ones of the multiple candidate cells that responded with corresponding resources. In block 550, the gNB 170-1 sends indications of resources for the selected ones of the multiple candidate cells toward the UE for use by the UE for dual-connected handover. See also step 7 of FIG. 4. For instance, if N in FIG. 2 is 5, and all candidate cells 260-2 through 260-5 respond with resources (and none of them reject the request), the PCell, gNB 170-1, could select only two of these candidate cells (candidate cells 260-2 and 260-3 in the example of FIG. 2) and send the resources for these selected cells to the UE 110.

In block 555, the gNB 170-1 determines which of the multiple candidate cells has been selected by UE as the (selected) PSCell for dual-connected handover. For instance, in FIG. 2, the UE selected cell 260-2 as the selected PSCell. This is part of the ADD phase 2 420. In more detail, the node hosting PSCell (gNB2 170-2) the secondary leg for the dual-connected handover would send some sort of indication to the node hosting the PCell (gNB1 170-2) to activate the data path through the secondary leg.

In block 560, the gNB 170-1 participates in a swap from being the serving cell for the UE to becoming a secondary cell (e.g., SgNB) for the UE. Additionally, a cell from the multiple candidate cells is swapped from a secondary cell to the serving cell for the UE. The gNB 170-1 participates in release of the connection to the UE in block 570. This results in the UE being connected to the selected candidate cell and being disconnected from the secondary cell (i.e., gNB 170-

1). Additional examples that might be performed by the gNB 170-1 are described below in reference to FIG. 6A.

Figure 6:
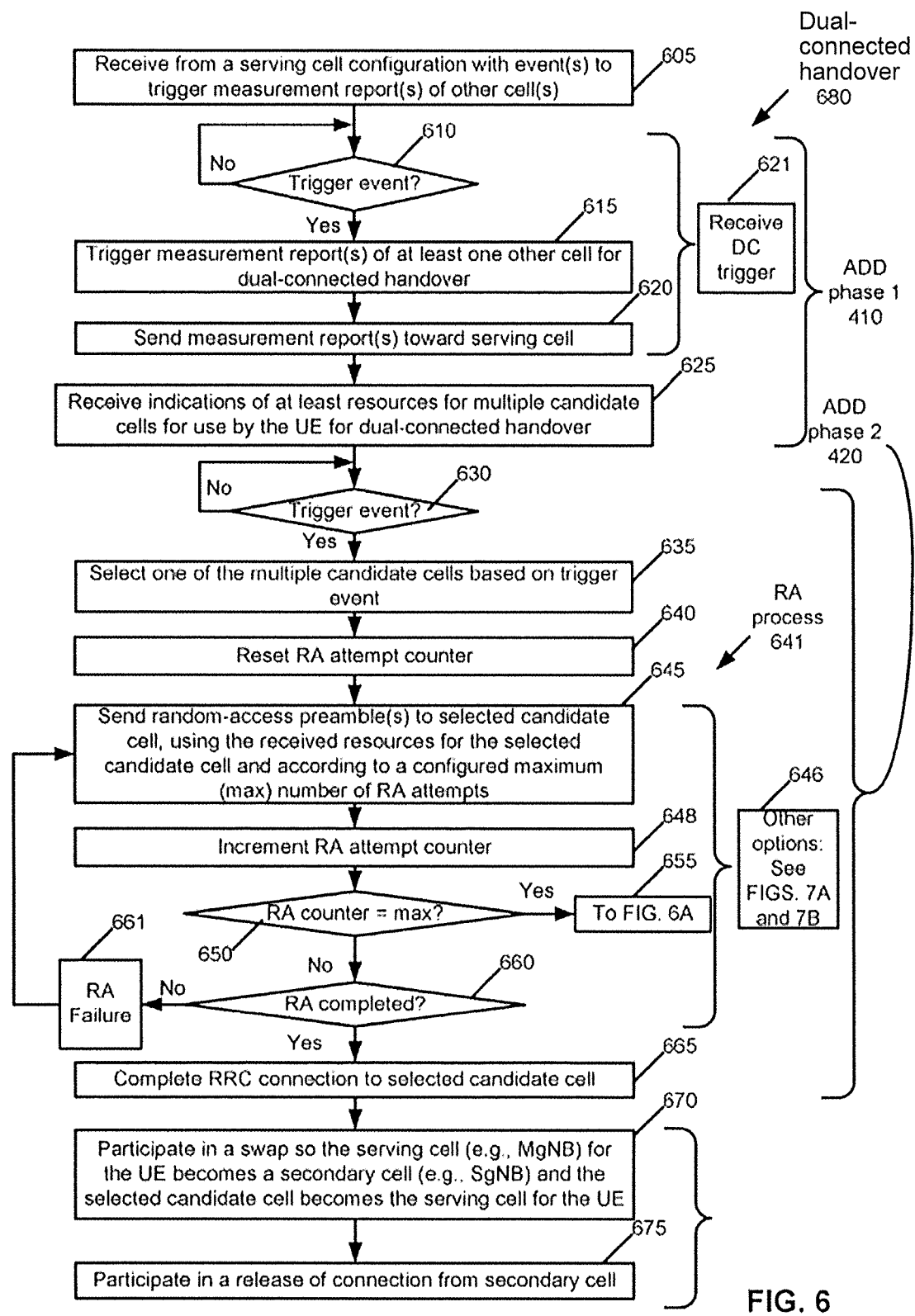
FIG. 6 is a logic flow diagram performed by a user equipment for two-step addition of a PSCell in dual-connected handover, in accordance with exemplary embodiments.

Referring to FIG. 6, this figure is a logic flow diagram performed by a user equipment for two-step addition of a PSCell in dual-connected handover. This figure also illustrates the operation of an exemplary method or methods, a result of execution of computer program instructions embodied on a computer readable memory, functions performed by logic implemented in hardware, and/or interconnected means for performing functions in accordance with exemplary embodiments. For instance, the DCHO module 140 may include multiples ones of the blocks in FIG. 6, where each included block is an interconnected means for performing the function in the block. The blocks in FIG. 6 are assumed to be performed by the UE 110, e.g., under control of the DCHO module 140 at least in part.

The dual-connected handover 680 is illustrated as being the entire process in FIG. 6. It is noted the handover 680 might be some portion of this process, too, depending on how a dual-connected (or multi-connected) handover is ultimately established in 3GPP.

In block 605, the UE 110 receives from a serving cell configuration with event(s) to trigger measurement report(s) of other cell(s). See also step 1 of FIG. 4. The UE determines in block 610 if one of the events has been triggered. If not (block 610=No), the UE continues to wait until an event has been triggered. If an event is triggered (block 610=Yes), the flow proceeds to block 615. See also step 2 of FIG. 4.

In block 615, the UE 110 triggers measurement report(s) of at least one other cell for dual-connected handover, and in block 620 the UE 110 sends the measurement report(s) toward the serving cell (e.g., gNB 170-1). See also step 3 in FIG. 4. Although this is typically a single trigger for a single measurement report, as previously described, there could be multiple measurements included in the measurement report. That is to say, one measurement report typically does not contain multiple measurement reports, but one measurement report can contain measurements from multiple measured neighbor cells.

It is noted that blocks 610, 615, and 620 could be replaced by block 621, where the UE 110 receives a DC trigger. This indicates to the UE that a dual-connectivity process should be started, and triggers the ADD phase 1 410 on the UE side.

In block 625, the UE 110 receives indications of at least resources for multiple candidate cells for use by the UE for dual-connected handover. See also step 7 of FIG. 4.

In block 630, the UE 110 determines if another trigger event has occurred. See also step 8 of FIG. 4. This other trigger event may be different from the first trigger event in block 610. The trigger could be freely decided by the network, utilizing any of the standardized triggers, e.g., A1-A6. At a minimum, the trigger condition (e.g., threshold, offset, and the like) would be different to 610. If not (block 630=No), the UE waits for a trigger event to occur. If another trigger event has occurred (block 630=Yes), the flow proceeds to block 635, where the UE selects one of the multiple candidate cells based on the trigger event. The UE 110 then performs a random access (RA) process 641 (blocks 640 to 660) to connect to the selected candidate cell. See also step 9 of FIG. 4. Note that FIG. 6 assumes the selected candidate cell is ultimately connected to by the UE, but this might not be the case. In fact, FIG. 6A describes options for when the RA process 641 fails, and also additional options that may be performed in parallel with the RA process 641 are presented in reference to FIGS. 7A and 7B.

In block 640, the UE resets a RA attempt counter. This counter is used to determine whether too many RA attempts have been performed. In block 645, the UE 110 sends random-access preamble(s) to the selected candidate cell, using the received resources (e.g., from block 625) for the selected candidate cell and according to a configured maximum (max) number of RA attempts. The UE 110 in block 648 increments the RA attempt counter, and in block 650, the UE 110 determines if the RA attempt counter has reach the configured maximum (max) number of RA attempts. If the max has been met (block 650=Yes), block 655 is performed, which is explained in reference to FIG. 6. If the max has not been met (block 650=No), the UE 110 determines whether the RA process 641 has completed. If the RA process has not completed (block 660=No), the flow proceeds to block 661, where there has been a RA failure, and then to block 645, where the UE continues part of the random-access process 641.

If the RA process 641 has been completed (block 660=Yes), the UE 110 in block 665 completes the RRC connection to the selected candidate cell. See also step 10 of FIG. 4.

In block 670, the UE 110 participates in a swap so the serving cell (e.g., MgNB, gNB 170-1) for the UE becomes a secondary cell (e.g., SgNB) and the selected candidate cell becomes the serving cell for the UE. In block 675, the UE 110 participating in a release of connection from the secondary cell (gNB 170-1). After block 675, the UE is connected to the selected candidate cell, and is disconnected from the secondary cell (gNB 170-1). See also steps 11 and 12 of FIG. 4.

Figure 6A:
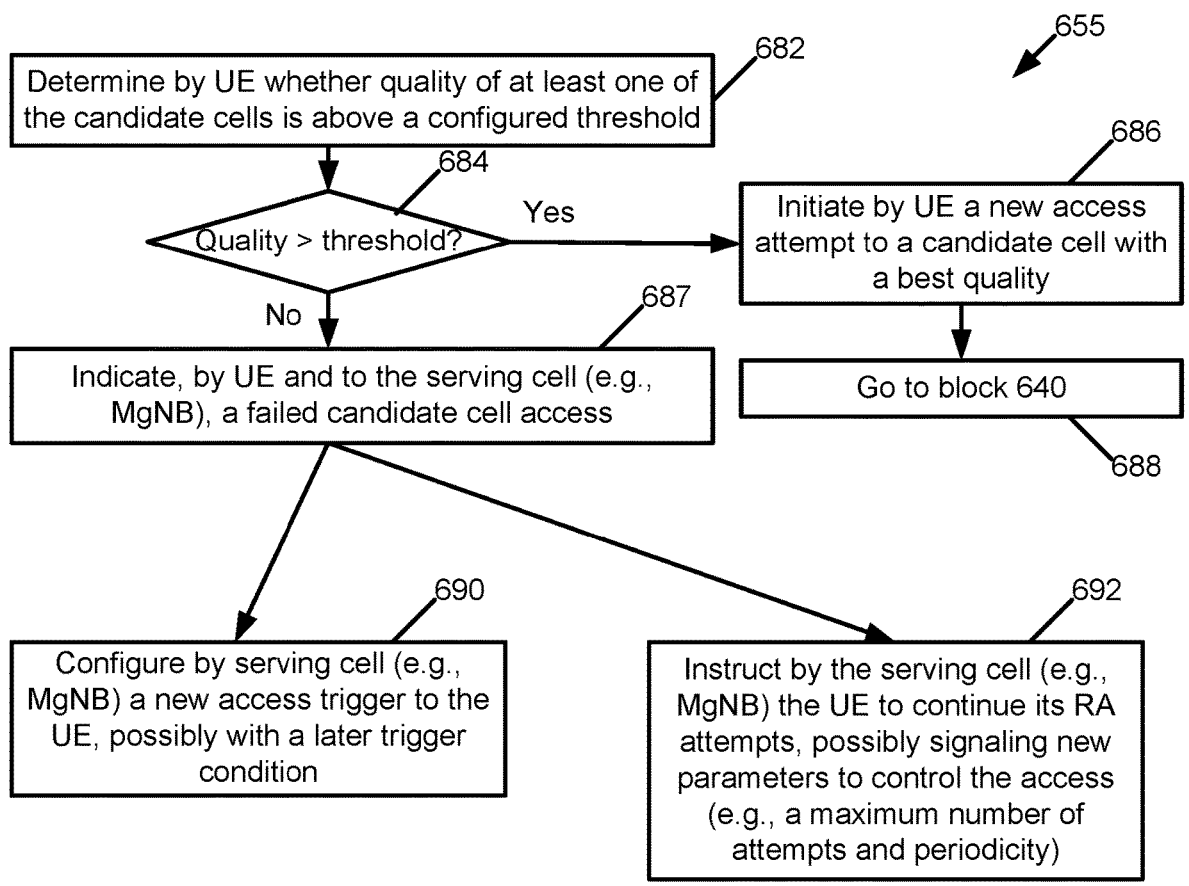
FIG. 6A is logic flow diagram performed by both a user equipment and a network element for operations that might be performed in response to a random access counter being over a maximum number of access attempts, in accordance with an exemplary embodiment.

FIG. 6A is used to describe other potential examples for what may happen in response to the RA attempt counter reaching a configured maximum (max) number of RA attempts. Referring to FIG. 6A, this figure is logic flow diagram performed by both a user equipment and a network element for operations that might be performed in response to a random access counter being over a maximum number of access attempts, in accordance with an exemplary embodiment. The network element is assumed to be gNB 170-1.

In block 682, the UE 110 determines whether quality of at least one of the candidate cells is above a configured threshold. Note that this includes all candidate PSCells, including the candidate PSCell selected in block 635. If the quality is greater than a threshold (block 684=Yes) for any one of the candidate cells, the UE 110 in block 686 initiates a new access attempt to a candidate cell with a best quality. That is, the current RA process 641 to the currently selected candidate cell is stopped, and a new RA process 641 is performed (see block 688), starting with resetting the RA attempt counter in block 640, with a newly selected candidate cell with a best quality. The new access attempt is performed because the old candidate cell quite likely was not a good choice, judging from the N failed access attempts. This option would allow the UE to continue access procedure without going to the more costly S-RLF recovery procedure.

If the quality of none of the candidate cells (e.g., including the candidate PSCell selected in block 635) are above the threshold (block 684=No), the UE 110 in block 687 indicates, to the serving cell (e.g., MgNB, gNB 170-1), a failed candidate cell access. In response, in block 690 the serving cell (e.g., MgNB, gNB 170-1) configures a new access trigger to the UE, possibly with a later trigger condition. As previously described, a later trigger condition refers to a condition where the target PSCell needs to be better by some quality measurement, compared to the original access attempt, e.g., an RSRP-A3 with a higher offset. Alternatively, in block 692, instruction is performed by the serving cell (e.g., MgNB) to the UE to continue its RA attempts, possibly signaling new parameters to control the access (e.g., a maximum number of attempts and periodicity).

Figure 7A:
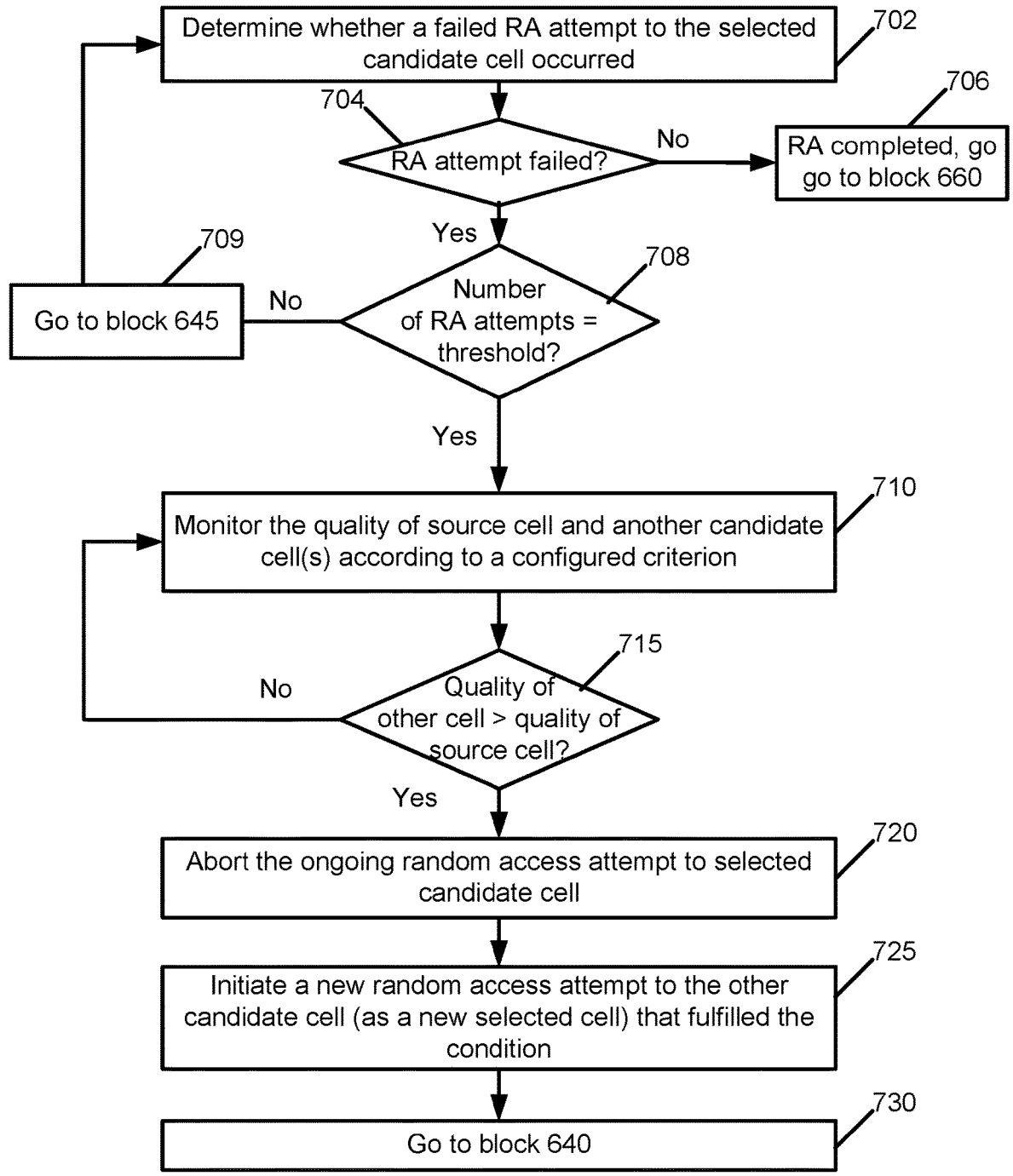
FIGS. 7A and 7B are logic flow diagrams performed by a user equipment of possible operations taken by the user equipment in a process occurring while the user equipment also performs a random access connection process to a selected target cell for dual-connected handover, in accordance with exemplary embodiments.
Figure 7B:
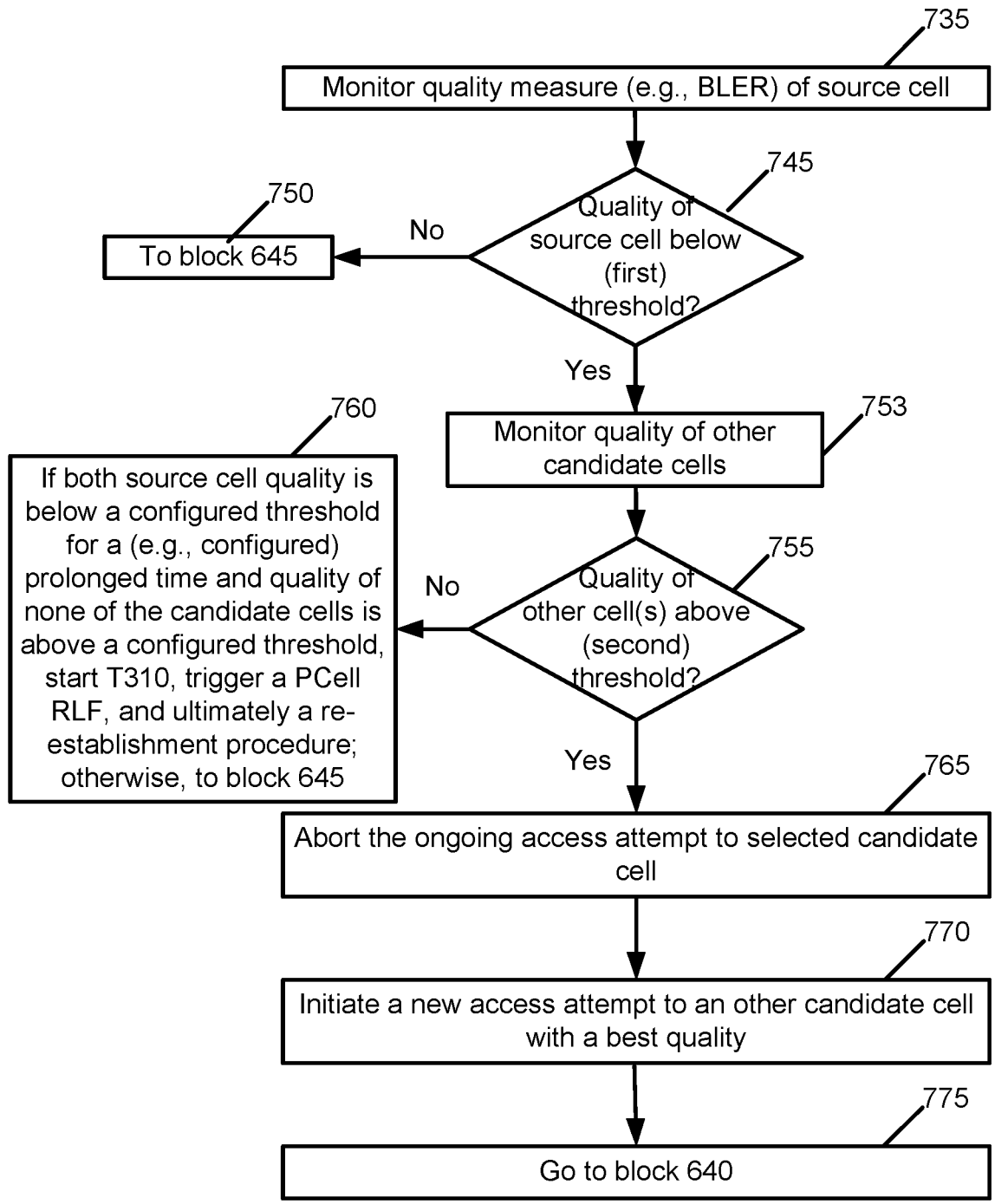

FIGS. 7A and 7B are logic flow diagrams performed by a user equipment of possible operations taken by the user equipment in a process occurring in parallel with the user equipment also performs a random access connection process to a selected target cell for dual-connected handover. These figures also illustrate the operation of an exemplary method or methods, a result of execution of computer program instructions embodied on a computer readable memory, functions performed by logic implemented in hardware, and/or interconnected means for performing functions in accordance with exemplary embodiments. The blocks in FIG. 6 are assumed to be performed by the UE 110, e.g., under control of the DCHO module 140 at least in part. For instance, the DCHO module 140 may include multiples ones of the blocks in FIG. 6, where each included block is an interconnected means for performing the function in the block.

Turning to FIG. 7A, this is one example of a process that can be performed while the RA process 641 is performed. In block 702, the UE 110 determines whether a failed RA attempt to the selected candidate cell occurred. If the RA attempt did not fail (block 704=No), in block 706, the UE 110 has had the RA completed, and the flow proceeds to block 660 of FIG. 6. If the RA attempt failed (block 704=Yes), the flow proceeds to block 708, where it is determined whether a number of RA attempts that have failed is equal to a threshold. The threshold could be a single RA attempt or some number N (greater than 1) of RA attempts. If the number of RA attempts that have failed is not equal to the threshold (block 708=No), the flow proceeds in block 709 back to block 645 of FIG. 6 and then to block 702. If the number of RA attempts is equal to the threshold (block 708=Yes), the flow proceeds to block 710.

In block 710, the UE 110 monitors the quality of the source cell (e.g., gNB 170-1) and another candidate cell (or cells) according to a configured criterion. The UE 110 in block 715 determines whether quality (based on the criterion) of the other cell is greater than (>) quality of source cell. If not (block 715=No), the flow proceeds back to block 710. If so (block 715=Yes), the flow proceeds to block 720. Block 715 uses a criterion which compares the quality of the source cell to quality (e.g., RSRP) of a candidate PSCell that is not the currently accessed PSCell. This would be to ensure that the candidate PSCell provides some chance for a successful RA attempt. Another possibility would be to compare the RSRQ of the candidate cell to some fixed threshold.

In block 720, the UE 110 aborts the ongoing random access attempt to the selected candidate cell. In block 725, the UE 110 initiates a new random access attempt to the other candidate cell that fulfilled the condition. The UE 110 then starts another RA process 641, starting at block 640, where the RA attempt counter is reset. See block 730.

Referring to FIG. 7B, this is another example of a process that can be performed while the RA process 641 is performed. The UE 110 in block 735 monitors a quality measure (e.g., BLER) of the source cell (e.g., gNB 170-1). In block 745, the UE 110 determines whether quality of the source cell is below a threshold. If not (block 745=Yes), the flow proceeds (see block 750) back to block 645 of FIG. 6. If the quality of the source cell is below the threshold (block 745=Yes), the UE in block 753 monitors quality of other candidate cells (e.g., including the selected cell from block 635 of FIG. 6). The UE 110 in block 755 determines whether quality of other candidate cell(s) are above a threshold. If not (block 755=No), in block 760, the UE 110, if both source cell quality is below a configured threshold for a (e.g., configured) prolonged time and quality of none of the candidate cells is above a configured threshold, starts timer T310, likely triggers a PCell RLF, and ultimately performs a re-establishment procedure. Otherwise, the flow proceeds to block 645 of FIG. 6.

If the quality of the other candidate cell(s) is above the threshold (block 755=Yes), the flow proceeds to block 765, where the UE 110 aborts the ongoing access attempt to the selected candidate cell. In block 770, the UE 110 initiates a new access attempt to an other candidate cell with a best quality. In block 775, the UE 110 goes to block 640, to start another RA process 641 to the other candidate cell.

It is noted that the thresholds in blocks 745 and 755 may be different thresholds. For instance a first threshold may be used in block 745 and a second, different threshold may be used in block 755.

The merits of the proposed techniques should be compared to the current state-of-the-art URLLC handover procedure, which is the following:

Dual Connected Handover (see I. Viering, H. Martikainen, A. Lobinger, B. Wegmann, "Zero-Zero Mobility: Intra-Frequency Handovers with Zero Interruption and Zero Failures", IEEE Network (Volume: 32, Issue: 2, March-April 2018) with one-step addition of the target PSCell; and Cell-pair specific early addition of the problem cells utilizing SON/MRO.

Compared to this baseline, the benefits and technical effects of the proposed techniques include one or more of the following.

1) Increased robustness and reduced handover preparation signaling due to optimized addition of target PSCells for dual RX/TX UEs. With one target PSCell, the earlier we need to configure the target, the more often the target will be the wrong one, and needs to be replaced. The replace condition will expire late, hence increasing a likelihood of a PCell radio link failure and re-establishment. Furthermore, each replace will add to the signaling overhead. With proposed exemplary 2-step methods, all candidate dual-connectivity legs can be prepared at an optimal moment, hence avoiding unnecessary replace operations, as well as avoiding implementation of more than 2 RX/TX in the UE.

2) Reduced signaling overhead due to avoidance of PSCell failures. Too early addition of a target PSCell in 1-step DCHO implies a failed random access, an aborting of the ADD procedure, and a new ADD procedure after recovering from the PSCell failure (S-RLF). This cycle repeats until the random access succeeds, increasing the signaling overhead. In 2-step DCHO, target PSCells can be prepared arbitrarily early without triggering PSCell failures.

3) Increased robustness due to earlier addition of a target PSCell. Earlier addition of a target cell will in general reduce the radio link failures and outage. With a suitable MRO mechanism, the early addition can be applied only for certain problematic cell pairs, hence mitigating the signaling impact. However, as discussed in the reduced signaling overhead point, it may not be feasible to add a target PSCell in bad channel conditions due to "S-RLF ping-pong". In any case, a target PSCell cannot be added before the cell is detected, implying a latency of (1) cell detection+(2) measurement report+(3) preparation in 1-step DCHO. In 2-step DCHO, operation (3) is completely avoided, and operation (2) may be reduced by applying a shorter measurement filtering and/or TTT. The triggering can be carried out in a faster manner in 2-step DCHO due to less severe impact of PSCell preparation ping-pongs compared to PSCell addition ping-pongs in the 1-step approach. A typical scenario where a detected PSCell would need to be added as fast as possible would be a building corner with source cell disappearing and target cell appearing at the same time in a fast manner.

4) Support of a predictive addition of PSCells. With 1-step DCHO, the target PSCell cannot be added too early, as adding means that the leg should fulfill the in-sync condition (SINR>Qout). With 2-step method, the candidate PSCells can be prepared in any cell according to some predictive method. Such predictive techniques could be feasible, e.g., for fast-speed UEs (cars, trains, and the like) and for deterministically moving UEs in industrial environments (e.g., mobile robots). PSCell addition can even be prepared before the cell is identified.

The following are additional exemplary embodiments.

Example 1

A method, comprising:
participating, by a primary cell for a user equipment, in a first phase to add a primary-secondary cell to a set of cells including the primary cell to be used by the user equipment for a multi-connected handover, the participating in the first phase comprising:
determining that the user equipment is to participate in the multi-connected handover; and
sending indications of at least resources for selected ones of multiple candidate cells toward the user equipment for use by the user equipment for the multi-connected handover; and
participating by the primary cell in a second phase to add the primary-secondary cell to the set of cells, the participating in the second phase comprising determining by the primary cell which of the selected multiple cells has been selected and accessed by the user equipment as the primary-secondary cell;
participating by the primary cell in a swap from being the primary cell for the user equipment to becoming a current primary-secondary cell for the user equipment, wherein the primary-secondary cell is swapped from the primary-secondary cell to being a current primary cell for the user equipment; and
participating by the current primary-secondary cell in release of a connection to the user equipment.

Example 2

The method of example 1, wherein the method further comprises:
signaling, in response to the determining that the user equipment is to participate in the multi-connected handover, a request to the multiple candidate cells to prepare for possible handover of the user equipment from the primary cell;
receiving responses from the multiple candidate cells, at least some of the responses indicating resources to be applied in case the user equipment should access the corresponding candidate cell; and
selecting the selected ones of the multiple candidate cells from the multiple candidate cells that responded with corresponding resources.

Example 3

The method of any one of examples 1 or 2, wherein determining that the user equipment is to participate in the multi-connected handover further comprises receiving, at the primary cell and from the user equipment, a measurement report from the user equipment, the measurement report in response to a previously configured event being met to trigger the measurement reports of another cell for multi-connected handover, and the primary cell determined the user equipment is to participate in the multi-connected handover based on reception of the measurement report.

Example 4

The method of any one of examples 1 or 2, wherein determining that the user equipment is to participate in the multi-connected handover further comprises determining that the user equipment is to participate in the multi-connected handover based on a network-side trigger.

Example 5

The method of example 4, further comprising sending a trigger to the user equipment cause the user equipment to begin a multi-connectivity handover process.

Example 6

The method of any one of examples 1 to 5, further comprising:
in response to an indication by the user equipment and to the primary cell of a failed candidate cell access, configuring by the primary cell a new access trigger to the user equipment, to be used by the user equipment to trigger the multi-connected handover.

Example 7

The method of any one of examples 1 to 5, further comprising:
in response to an indication by the user equipment and to the primary cell of a failed candidate cell access, instructing by the primary cell the user equipment to continue its random access attempts to the primary-secondary cell.

Example 8

The method of any one of examples 1 to 7, wherein the multi-connected handover is limited to a dual-connected handover.

Example 9

The method of any one of examples 1 to 7, further comprising:
adding by the primary cell in the second phase an other primary-secondary cell to the set of cells, wherein the other primary-secondary cell is used for the multi-connected handover.

Example 10

A method, comprising:
participating, by a user equipment in connection with a primary cell, in a first phase to add a primary-secondary cell to a set of cells including the primary cell to be used by the user equipment for a multi-connected handover, the participating in the first phase comprising:

receiving indications of at least resources for multiple candidate cells for use by the user equipment for the multi-connected handover;

participating by the user equipment in a second phase to add the primary-secondary cell to the set of cells, the participating in the second phase comprising:

selecting one of the multiple candidate cells as the primary-secondary cell based on a trigger event; and accessing the primary-secondary cell, using received resources corresponding to the selected one of the multiple candidate cells; and participating in a swap causing the primary cell for the user equipment to become a current primary-secondary cell for the user equipment and causing the primary-secondary cell to be swapped from a primary-secondary cell to a current primary cell for the user equipment; and participating in release of a connection to the current primary-secondary cell.

Example 11

The method of example 10, wherein participating in the first phase comprises, prior to receiving the indications, sending by a user equipment a measurement report toward a primary cell, the measurement report triggered for another cell for multi-connected handover, the measurement report sent in response to another trigger event, wherein the receiving the indications is in response to the sending of the measurement report.

Example 12

The method of example 10, further comprising receiving a trigger indicating the user equipment should start a multi-connectivity handover process and, responsive to the trigger, participating in the first phase.

Example 13

The method of any one of examples 10 to 12, wherein accessing the primary-secondary cell comprises:

sending, as part of a random-access process and by the user equipment, one or more random-access preambles to the primary-secondary cell; and in response to the random-access process completing to the primary-secondary cell, completing a radio resource control connection to the primary-secondary cell.

Example 14

The method of any one of examples 10 to 13, wherein:

accessing the primary-secondary cell comprises further comprises sending, as part of a random-access process and by the user equipment, one or more random-access preambles to the primary-secondary cell;

the method further comprises incrementing a counter for each attempt to connect to the primary-secondary cell via the sending the one or more random-access preambles;

the method further comprises performing the following in response to the counter reaching a maximum number:

determining by the user equipment whether quality of at least one of the multiple candidate cells is above a configured threshold;

performing one of the following based on the determining:

in response to quality of one of the multiple candidate cells being above the configured threshold, selecting the one candidate cell as the primary-secondary cell and initiating a new access attempt to the selected one candidate cell as the primary-secondary cell, using received resources corresponding to the selected one candidate cell; or in response to quality of none of the multiple candidate cells being above the configured threshold, indicating by the user equipment and to the primary cell a failed candidate cell access.

Example 15

The method of any one of examples 10 to 13, wherein:

the primary-secondary cell is a currently selected primary-secondary cell;

accessing the primary-secondary cell comprises further comprises performing a random access attempt to the currently selected primary-secondary cell;

the method includes in response to a number of random access attempts by the user equipment to the currently selected primary-secondary cell meeting a threshold, performing the following:

monitoring a quality of the primary cell and other ones of the multiple candidate cells that are not the currently selected primary-secondary cell according to a configured criterion; and in response to a quality of one of the other ones of the multiple candidate cells being greater than the quality of the primary cell based on the configured criterion, aborting ongoing random access attempts to the currently-selected primary-secondary cell, selecting the one multiple candidate cell as the currently selected primary-secondary cell, and initiating a new random access attempt to the currently selected primary-secondary cell.

Example 16

The method of any one of examples 10 to 13, wherein:

the primary-secondary cell is a currently selected primary-secondary cell;

the method includes in response to a quality measure of the primary cell being below a first threshold but a quality measure of one of other ones of the multiple candidate cells that are not the currently selected primary-secondary cell being above a second threshold, performing the following:

selecting the one multiple candidate cell as the currently selected primary-secondary cell; and initiating a new random access attempt to the currently selected primary-secondary cell.

Example 17

The method of example 16, further comprising:

in response to a quality measure of the primary cell being below a first threshold and quality measures of all of the other ones of the multiple candidate cells and the currently selected primary-secondary cell not being above a second threshold, triggering a primary cell radio link failure.

Example 18

The method of any of examples 10 to 17, wherein the multi-connected handover is limited to a dual-connected handover.

Example 19

The method of any of examples 10 to 17, wherein an other primary-secondary cell is added in the second phase to the set of cells, wherein the user equipment uses the other primary-secondary cell for the multi-connected handover.

Example 20

A computer program product comprising a non-transitory computer-readable medium encoded with instructions that, when executed by an apparatus, cause the apparatus to perform the method of any one of examples 1 to 19.

Example 21

An apparatus, comprising:
one or more processors; and
one or more memories including computer program code,
the one or more memories and the computer program code configured, with the one or more processors, to cause the apparatus to perform at least the following:
participating, by a primary cell for a user equipment, in a first phase to add a primary-secondary cell to a set of cells including the primary cell to be used by the user equipment for a multi-connected handover, the participating in the first phase comprising:
determining that the user equipment is to participate in the multi-connected handover; and
sending indications of at least resources for selected ones of multiple candidate cells toward the user equipment for use by the user equipment for the multi-connected handover; and
participating by the primary cell in a second phase to add the primary-secondary cell to the set of cells, the participating in the second phase comprising determining by the primary cell which of the selected multiple cells has been selected and accessed by the user equipment as the primary-secondary cell;
participating by the primary cell in a swap from being the primary cell for the user equipment to becoming a current primary-secondary cell for the user equipment, wherein the primary-secondary cell is swapped from the primary-secondary cell to being a current primary cell for the user equipment; and
participating by the current primary-secondary cell in release of a connection to the user equipment.

Example 22

The apparatus of example 21, wherein the one or more memories and the computer program code are configured, with the one or more processors, to cause the apparatus to perform at least the following:
signaling, in response to the determining that the user equipment is to participate in the multi-connected handover, a request to the multiple candidate cells to prepare for possible handover of the user equipment from the primary cell;
receiving responses from the multiple candidate cells, at least some of the responses indicating resources to be applied in case the user equipment should access the corresponding candidate cell; and
selecting the selected ones of the multiple candidate cells from the multiple candidate cells that responded with corresponding resources.

Example 23

The apparatus of any one of examples 21 or 22, wherein determining that the user equipment is to participate in the multi-connected handover further comprises receiving, at the primary cell and from the user equipment, a measurement report from the user equipment, the measurement report in response to a previously configured event being met to trigger the measurement reports of another cell for multi-connected handover, and the primary cell determined the user equipment is to participate in the multi-connected handover based on reception of the measurement report.

Example 24

The apparatus of any one of examples 21 or 22, wherein determining that the user equipment is to participate in the multi-connected handover further comprises determining that the user equipment is to participate in the multi-connected handover based on a network-side trigger.

Example 25

The apparatus of example 24, wherein the one or more memories and the computer program code are configured, with the one or more processors, to cause the apparatus to perform at least the following: sending a trigger to the user equipment cause the user equipment to begin a multi-connectivity handover process.

Example 26

The apparatus of any one of examples 21 to 25, wherein the one or more memories and the computer program code are configured, with the one or more processors, to cause the apparatus to perform at least the following:
in response to an indication by the user equipment and to the primary cell of a failed candidate cell access, configuring by the primary cell a new access trigger to the user equipment, to be used by the user equipment to trigger the multi-connected handover.

Example 27

The apparatus of any one of examples 21 to 25, wherein the one or more memories and the computer program code are configured, with the one or more processors, to cause the apparatus to perform at least the following:
in response to an indication by the user equipment and to the primary cell of a failed candidate cell access, instructing by the primary cell the user equipment to continue its random access attempts to the primary-secondary cell.

Example 28

The apparatus of any one of examples 21 to 27, wherein the multi-connected handover is limited to a dual-connected handover.

Example 29

The apparatus of any one of examples 21 to 27, wherein the one or more memories and the computer program code are configured, with the one or more processors, to cause the apparatus to perform at least the following:
adding by the primary cell in the second phase an other primary-secondary cell to the set of cells, wherein the other primary-secondary cell is used for the multi-connected handover.

Example 30

An apparatus, comprising:
one or more processors; and
one or more memories including computer program code,
the one or more memories and the computer program code configured, with the one or more processors, to cause the apparatus to perform at least the following:

participating, by a user equipment in connection with a primary cell, in a first phase to add a primary-secondary cell to a set of cells including the primary cell to be used by the user equipment for a multi-connected handover, the participating in the first phase comprising:

receiving indications of at least resources for multiple candidate cells for use by the user equipment for the multi-connected handover;

participating by the user equipment in a second phase to add the primary-secondary cell to the set of cells, the participating in the second phase comprising:

selecting one of the multiple candidate cells as the primary-secondary cell based on a trigger event; and accessing the primary-secondary cell, using received resources corresponding to the selected one of the multiple candidate cells; and participating in a swap causing the primary cell for the user equipment to become a current primary-secondary cell for the user equipment and causing the primary-secondary cell to be swapped from a primary-secondary cell to a current primary cell for the user equipment; and participating in release of a connection to the current primary-secondary cell.

Example 31

The apparatus of example 30, wherein participating in the first phase comprises, prior to receiving the indications, sending by a user equipment a measurement report toward a primary cell, the measurement report triggered for another cell for multi-connected handover, the measurement report sent in response to another trigger event, wherein the receiving the indications is in response to the sending of the measurement report.

Example 32

The apparatus of example 30, wherein the one or more memories and the computer program code are configured, with the one or more processors, to cause the apparatus to perform at least the following: receiving a trigger indicating the user equipment should start a multi-connectivity handover process and, responsive to the trigger, participating in the first phase.

Example 33

The apparatus of any one of examples 30 to 32, wherein accessing the primary-secondary cell comprises:

sending, as part of a random-access process and by the user equipment, one or more random-access preambles to the primary-secondary cell; and in response to the random-access process completing to the primary-secondary cell, completing a radio resource control connection to the primary-secondary cell.

Example 34

The apparatus of any one of examples 30 to 33, wherein:
accessing the primary-secondary cell comprises further comprises sending, as part of a random-access process and by the user equipment, one or more random-access preambles to the primary-secondary cell;

the one or more memories and the computer program code are configured, with the one or more processors, to cause the apparatus to perform at least the following: incrementing a counter for each attempt to connect to the primary-secondary cell via the sending the one or more random-access preambles;

the one or more memories and the computer program code are configured, with the one or more processors, to cause the apparatus to perform at least the following: performing the following in response to the counter reaching a maximum number:

determining by the user equipment whether quality of at least one of the multiple candidate cells is above a configured threshold;

performing one of the following based on the determining:

in response to quality of one of the multiple candidate cells being above the configured threshold, selecting the one candidate cell as the primary-secondary cell and initiating a new access attempt to the selected one candidate cell as the primary-secondary cell, using received resources corresponding to the selected one candidate cell; or in response to quality of none of the multiple candidate cells being above the configured threshold, indicating by the user equipment and to the primary cell a failed candidate cell access.

Example 35

The apparatus of any one of examples 30 to 33, wherein:
the primary-secondary cell is a currently selected primary-secondary cell;

accessing the primary-secondary cell comprises further comprises performing a random access attempt to the currently selected primary-secondary cell;

the one or more memories and the computer program code are configured, with the one or more processors, to cause the apparatus to perform at least the following: in response to a number of random access attempts by the user equipment to the currently selected primary-secondary cell meeting a threshold, performing the following:

monitoring a quality of the primary cell and other ones of the multiple candidate cells that are not the currently selected primary-secondary cell according to a configured criterion; and in response to a quality of one of the other ones of the multiple candidate cells being greater than the quality of the primary cell based on the configured criterion, aborting ongoing random access attempts to the currently-selected primary-secondary cell, selecting the one multiple candidate cell as the currently selected primary-secondary cell, and initiating a new random access attempt to the currently selected primary-secondary cell.

Example 36

The apparatus of any one of examples 30 to 33, wherein:
the primary-secondary cell is a currently selected primary-secondary cell;

wherein the one or more memories and the computer program code are configured, with the one or more processors, to cause the apparatus to perform at least the following: in response to a quality measure of the primary cell being below a first threshold but a quality measure of one of other ones of the multiple candidate cells that are not the currently selected primary-secondary cell being above a second threshold, performing the following:

selecting the one multiple candidate cell as the currently selected primary-secondary cell; and initiating a new random access attempt to the currently selected primary-secondary cell.

Example 37

The apparatus of example 36, wherein the one or more memories and the computer program code are configured, with the one or more processors, to cause the apparatus to perform at least the following:

in response to a quality measure of the primary cell being below a first threshold and quality measures of all of the other ones of the multiple candidate cells and the currently selected primary-secondary cell not being above a second threshold, triggering a primary cell radio link failure.

Example 38

The apparatus of any of examples 30 to 37, wherein the multi-connected handover is limited to a dual-connected handover.

Example 39

The apparatus of any of examples 30 to 37, wherein an other primary-secondary cell is added in the second phase to the set of cells, wherein the user equipment uses the other primary-secondary cell for the multi-connected handover.

Example 40

An apparatus, comprising:

means for participating, by a primary cell for a user equipment, in a first phase to add a primary-secondary cell to a set of cells including the primary cell to be used by the user equipment for a multi-connected handover, the means for participating in the first phase comprising:

means for determining that the user equipment is to participate in the multi-connected handover; and means for sending indications of at least resources for selected ones of multiple candidate cells toward the user equipment for use by the user equipment for the multi-connected handover; and means for participating by the primary cell in a second phase to add the primary-secondary cell to the set of cells, the means for participating in the second phase comprising determining by the primary cell which of the selected multiple cells has been selected and accessed by the user equipment as the primary-secondary cell;

means for participating by the primary cell in a swap from being the primary cell for the user equipment to becoming a current primary-secondary cell for the user equipment, wherein the primary-secondary cell is swapped from the primary-secondary cell to being a current primary cell for the user equipment; and means for participating by the current primary-secondary cell in release of a connection to the user equipment.

Example 41

The apparatus of example 40, further comprising means for performing any of the methods of examples 2 to 9.

Example 42

An apparatus, comprising:

means for participating, by a user equipment in connection with a primary cell, in a first phase to add a primary-secondary cell to a set of cells including the primary cell to be used by the user equipment for a multi-connected handover, the means for participating in the first phase comprising:

receiving indications of at least resources for multiple candidate cells for use by the user equipment for the multi-connected handover;

means for participating by the user equipment in a second phase to add the primary-secondary cell to the set of cells, the means for participating in the second phase comprising:

means for selecting one of the multiple candidate cells as the primary-secondary cell based on a trigger event; and means for accessing the primary-secondary cell, using received resources corresponding to the selected one of the multiple candidate cells; and means for participating in a swap causing the primary cell for the user equipment to become a current primary-secondary cell for the user equipment and causing the primary-secondary cell to be swapped from a primary-secondary cell to a current primary cell for the user equipment; and means for participating in release of a connection to the current primary-secondary cell.

Example 43

The apparatus of example 42, further comprising means for performing any of the methods of examples 11 to 19.

Example 44

A computer program, comprising program code for performing any of the methods of examples 1 to 19, when the computer program is run on a processor.

Example 45

The computer program according to example 44, wherein the computer program is a computer program product comprising a computer-readable medium bearing computer program code embodied therein for use with a computer.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method, comprising:
receiving, with a user equipment and from a primary cell, a radio resource control reconfiguration message, wherein the radio resource control reconfiguration message comprises information associated with at least one candidate primary secondary cell, at least one access trigger and at least one access control parameter;
detecting a trigger event based on the at least one access trigger;
determine, with the user equipment, one of the at least one candidate primary secondary cell to select to perform random access, in response to occurrence of the trigger event that is based on the at least one access trigger received within the radio resource control reconfiguration message; and
perform random access to the selected primary secondary cell using the at least one access control parameter, during a multi-connected handover operation in which the user equipment is in dual connectivity with the primary cell and primary secondary cell prior to release of the user equipment from the primary cell.

2. The method of claim 1, further comprising:
swapping the roles of the primary cell (PCell) and the selected primary secondary cell (PSCell) such that the PCell becomes PSCell and the selected PSCell becomes PCell.

3. The method of claim 2, further comprising:
removing the PSCell upon detection of another trigger event.

4. The method of claim 1, further comprising:
during the random access to the selected primary secondary cell (PSCell), monitoring, with the user equipment, quality of at least one other candidate PSCell;
in an instance in which a quality of a cell satisfies a criterion, aborting, with the user equipment, the ongoing access attempt to the selected PSCell and initiating, with the user equipment, random access to the cell for which the quality satisfies the criterion.

5. The method of claim 1, further comprising:
during the random access to the selected primary secondary cell (PSCell), monitoring, with the user equipment, quality of the primary cell (PCell) and other candidate PSCell;
in an instance in which the quality of the PCell is below a configured threshold and quality of a candidate PSCell is above another configured threshold, aborting, with the user equipment, ongoing access attempt to the selected PSCell and initiating, with the user equipment, random access to a candidate PSCell with the best quality.

6. The method of claim 1, further comprising:
during the random access to the selected primary secondary cell (PSCell), monitoring quality of the primary cell (PCell) and at least one other candidate PSCell;
in an instance in which the quality of the PCell is below a configured threshold for a configured period of time and the quality of none of the at least one other candidate PSCell is above another configured threshold, triggering radio link failure.

7. The method of claim 1, further comprising:
in response to maximum number of random access attempts being reached on the selected primary secondary cell (PSCell), perform at least one of:
in response to a quality of at least one of the candidate primary secondary cells (PSCells) being above a configured threshold, initiating random access to a candidate PSCell with best quality; and
in response to a quality of none of the candidate PSCells being above a configured threshold, indicating a failed PSCell access to the primary cell (PCell).

8. The method of claim 1, wherein the at least one access control parameter within the received radio resource control (RRC) reconfiguration message comprises a random access attempt counter used to determine whether to continue to perform the random access to the selected primary secondary cell (PSCell).

9. The method of claim 1, further comprising:
receiving a measurement control message comprising an event trigger;
determining a set of the at least one candidate primary secondary cell, in response to occurrence of the event trigger; and
transmitting a measurement report to a network node from which the radio resource control (RRC) reconfiguration message was received, prior to receiving the RRC reconfiguration message;
wherein the measurement report comprises at least one measurement for one of the at least one candidate primary secondary cell among the set that triggered the occurrence of the event trigger.

10. The method of claim 9, wherein the RRC reconfiguration message comprises information associated with the determined set of the at least one candidate primary secondary cell.

11. An apparatus, comprising:
one or more processors; and
one or more non-transitory memories including computer program code, the one or more memories and the computer program code configured to, with the one or more processors, cause the apparatus to at least:
receive, from a primary cell, a radio resource control reconfiguration message, wherein the radio resource control reconfiguration message comprises information associated with at least one candidate primary secondary cell, at least one access trigger and at least one access control parameter;
detect a trigger event based on the at least one access trigger;
determine one of the at least one candidate primary secondary cell to select to perform random access, in response to occurrence of the trigger event that is based on the at least one access trigger received within the radio resource control reconfiguration message; and
perform random access to the selected primary secondary cell using the at least one access control parameter, during a multi-connected handover operation in which a user equipment is in dual connectivity with the primary cell and primary secondary cell prior to release of the user equipment from the primary cell.

12. The apparatus of claim 11, wherein the apparatus is further caused to:
swap the roles of the primary cell (PCell) and the selected primary secondary cell (PSCell) such that the PCell becomes PSCell and the selected PSCell becomes PCell.

13. The apparatus of claim 12, wherein the apparatus is further caused to:
remove the PSCell upon detection of another trigger event.

14. The apparatus of claim 11, wherein the apparatus is further caused to:
during the random access to the selected primary secondary cell (PSCell), monitor quality of at least one other candidate PSCell;
in an instance in which a quality of a cell satisfies a criterion, abort the ongoing access attempt to the selected PSCell and initiate random access to the cell for which the quality satisfies the criterion.

15. The apparatus of claim 11, wherein the apparatus is further caused to:
during the random access to the selected primary secondary cell (PSCell), monitor quality of the primary cell (PCell) and other candidate PSCell;
in an instance in which the quality of the PCell is below a configured threshold and quality of a candidate PSCell is above another configured threshold, abort ongoing access attempt to the selected PSCell and initiate random access to a candidate PSCell with the best quality.

16. The apparatus of claim 11, wherein the apparatus is further caused to:
during the random access to the selected primary secondary cell (PSCell), monitor quality of the primary cell (PCell) and at least one other candidate PSCell;
in an instance in which the quality of the PCell is below a configured threshold for a configured period of time and the quality of none of the candidate at least one other PSCell is above another configured threshold, trigger radio link failure.

17. The apparatus of claim 11, wherein the apparatus is further caused to:
in response to maximum number of random access attempts being reached on the selected primary secondary cell (PSCell), perform at least one of:

in response to a quality of at least one of the candidate primary secondary cells (PSCells) being above a configured threshold, initiate random access to a candidate PSCell with best quality; or
in response to a quality of none of the candidate PSCells being above a configured threshold, indicate a failed PSCell access to the primary cell (PCell).

18. An apparatus, comprising:
one or more processors; and
one or more non-transitory memories including computer program code, the one or more memories and the computer program code configured to, with the one or more processors, cause the apparatus to at least:
send, to a user equipment, a radio resource control reconfiguration message, wherein the radio resource control reconfiguration message comprises information associated with at least one candidate primary secondary cell, at least one access trigger and at least one access control parameter;
cause the user equipment to determine one of the at least one candidate primary secondary cell to select to perform random access, in response to detection of occurrence of a trigger event based on the at least one access trigger that is received within the radio resource control reconfiguration message; and
cause the user equipment to perform random access to the selected primary secondary cell using the at least one access control parameter.

19. The apparatus of claim 18, wherein the apparatus is further caused to:
determine that the user equipment is to participate in a multi-connected handover, based on a priori information about a route of the user equipment.

20. The apparatus of claim 18, wherein the apparatus is further caused to:
receive a radio resource control (RRC) configuration message from the at least one candidate primary secondary cell (PSCell) comprising at least one resource of the at least one candidate PSCell; and
determine a set of the at least one candidate PSCell to use with the user equipment for a multi-connected handover, based on the received RRC configuration message from the at least one candidate PSCell;
wherein the RRC reconfiguration message sent to the user equipment comprises an indication of the at least one resource of the determined set of the at least one candidate PSCell.

* * * * *